United States Patent [19]
Yoshida et al.

[11] Patent Number: 5,773,509
[45] Date of Patent: Jun. 30, 1998

[54] HEAT RESISTANT RESIN COMPOSITION, HEAT RESISTANT FILM ADHESIVE AND PROCESS FOR PRODUCING THE SAME

[75] Inventors: Tatsuhiro Yoshida, Kawasaki; Keizo Takahama, Yokohama; Syusaku Okamyo, Kawasaki, all of Japan

[73] Assignee: Sumitomo Bakelite Company Limited, Tokyo, Japan

[21] Appl. No.: 399,644

[22] Filed: Mar. 7, 1995

[30] Foreign Application Priority Data

| | | | |
|---|---|---|---|
| Mar. 8, 1994 | [JP] | Japan | 6-036887 |
| Jun. 23, 1994 | [JP] | Japan | 6-141912 |
| Jul. 18, 1994 | [JP] | Japan | 6-164975 |
| Jul. 22, 1994 | [JP] | Japan | 6-170924 |

[51] Int. Cl.$^6$ ............ C08L 77/00; C08G 73/10
[52] U.S. Cl. ............ 524/600; 524/607; 528/26; 528/38; 528/353; 526/262; 526/935; 525/422; 525/431; 525/432; 525/436; 525/476; 525/502; 428/450; 428/473.5
[58] Field of Search ............ 528/26, 38, 353; 526/262, 935; 524/600, 607; 525/422, 506, 431, 432, 436, 476; 428/473.5, 450; 523/433, 434, 435

[56] References Cited

U.S. PATENT DOCUMENTS

| | | | |
|---|---|---|---|
| 4,497,922 | 2/1985 | Sato et al. | 528/26 |
| 4,511,705 | 4/1985 | Makino et al. | 528/26 |
| 4,645,688 | 2/1987 | Makino et al. | 528/26 |
| 4,758,476 | 7/1988 | Sekine et al. | 528/26 |
| 4,996,293 | 2/1991 | Tsuyoshi | 528/352 |
| 5,089,549 | 2/1992 | Kato | 524/600 |
| 5,133,989 | 7/1992 | Numata et al. | 428/458 |
| 5,252,687 | 10/1993 | Shiomi et al. | 525/502 |
| 5,283,313 | 2/1994 | Yamashita et al. | 528/125 |
| 5,349,029 | 9/1994 | Ham | 525/476 |

FOREIGN PATENT DOCUMENTS

| | | |
|---|---|---|
| 525453 | 2/1993 | Japan . |
| 5140525 | 6/1993 | Japan . |
| 5311147 | 11/1993 | Japan . |
| 6157875 | 6/1994 | Japan . |
| 6172716 | 6/1994 | Japan . |

*Primary Examiner*—P. Hampton-Hightower
*Attorney, Agent, or Firm*—Browdy and Neimark

[57] ABSTRACT

A heat resistant resin composition comprising, as the main components, (A) 100 parts by weight of an organic solvent-soluble polyimide resin having a glass transition temperature of 350° C. or less, (B) 5 to 100 parts by weight of an epoxy compound having at least two epoxy groups in one molecule, and (C) 0.1 to 20 parts by weight of a compound having an active hydrogen group which can react with the epoxy compound (B), a heat resistant film adhesive comprising, as the main components, the above components (A), (B) and (C), and a process for producing a heat resistant film adhesive by casting a solution of the above heat resistant resin composition on one side or both sides of a support.

12 Claims, No Drawings

HEAT RESISTANT RESIN COMPOSITION, HEAT RESISTANT FILM ADHESIVE AND PROCESS FOR PRODUCING THE SAME

BACKGROUND OF THE INVENTION

This invention relates to a heat resistant resin composition which is excellent in heat resistance, soluble in organic solvents and excellent in moldability, to a film adhesive which has both heat resistance and low-temperature processability and is excellent in bonding strength to a silicon substrate and a metal which are suitable for electronics uses, particularly suitable as an IC packaging material, and to a process for producing the same.

Recently, tends of high performance and large capacity have brought large-sized silicon chips. However, a restriction in printed circuit design and requirement of miniaturization of consumer electronic products demand the same or smaller outer size of IC package. In response to this tendency, new several packaging techniques have been proposed which meet the requirements for high density semiconductor chip and high density packaging. For example, there have been proposed a COL (chip on lead) structure in which chips are mounted on a lead frame without a die pad proposed for a memory device and a LOC (lead on chip) structure which is a developed form of the COL structure and in which lead is located on chip. On the other hand, in the case of a logic device, there is a multilayer lead frame structure in which a power source ground is formed as a different frame and a metal plate for heat dispersion is multilayered. According to them, rationalization of wiring in a chip and rationalization of wire bonding, high speed signal by wire-shortening, dispersion of heat generated with an increase of consumed power and miniaturization of a device can be achieved.

In these new packaging techniques, there are bonding interfaces between same materials and between different materials such as silicon chip and lead frame, lead frame and plate, lead frame and lead frame and the like, and the bonding reliability very greatly affects the reliability of a device. That is to say, not only such reliability that the device can stand the step temperature during the device assembling but also bonding reliability at a time of moisture absorption, heating under moisture or the like are required. Moreover, bondability is an important matter.

Heretofore, in bonding them, a pasty adhesive and an adhesive coated on a heat resistant substrate have been used. As the adhesive, there are used thermosetting resins of epoxy type, acrylic type and rubber-phenol resin type; however, it cannot be said that they satisfy the requirements as a highly reliable adhesive because a large amount of ionic impurities are contained, a high temperature and a long period of time are required for curing so that the productivity is bad and a large amount of volatile matter is generated and contaminates leads and hygroscopicity is high. Thus, satisfactory materials have not been found by now. Accordingly, the development of an adhesive suitable for the new package has been desired. As one of the adhesives, there is mentioned a hot-melt type film adhesive using a polyimide resin.

Since the polyimide resin is excellent in heat resistance, is flame-retardant and is excellent in electric insulation property, the polyimide resin is widely used as a film in substrates for a flexible printed wiring board and a heat resistant adhesive tape, and also used in the form of a resin varnish for a semiconductor interlaminar insulation film, a surface-protective coating and the like. However, conventional polyimide resins have high hygroscopicity and excellent heat resistance, while they are insoluble and infusible and have a very high melting point, and hence, cannot be said to be a material easy to handle in respect of processability. The polyimide resins are also used as a packaging material for semi-conductors in an interlaminar insulation film, a surface protective coating and the like. However, in this case, an organic solvent solution of a polyamic acid which is an organic solvent-soluble precursor of a polyimide resin is coated on the surface of a semiconductor and then heated to remove the solvent and simultaneously imidize the polyamic acid. In this case, in order to allow the imidization to proceed completely, and also to volatilize the high boiling point amide type solvent, a drying step at a high temperature of 300° C. or more is required. Therefore, it follows that the semiconductor is exposed to such a high temperature, and hence, heat damage of other materials and degradation of the device are brought about and the yield in the assembly step is lowered. Also, since the hygroscopicity of the film is high, there are such problems that the moisture absorbed is vaporized at one time when it is exposed to a high temperature to cause blisters and cracks.

As a method for overcoming the above defects, a method has been proposed in which a film-shaped adhesive is formed from an organic solvent-soluble, already fully imidized polyimide resin composition and this is subjected to thermal compression bonding to an adherend (see Japanese Patent Application Kokai Nos. 5-105,850; 5-112,760; and 5-112,761). However, in such a case that the polyimide resin is used as a hot melt adhesive, when the polyimide resin has a high glass transition temperature, a very high temperature is required for processing and there is a great fear that the adherend may be thermally damaged. On the other hand, when the glass transition temperature of the polyimide resin is lowered for imparting a low-temperature processability to the polyimide resin, there is a problem that the characteristics of polyimide resin being heat resistant cannot be sufficiently utilized.

SUMMARY OF THE INVENTION

The present inventors have made extensive research on a heat resistant resin having excellent heat resistance and low-temperature processability, and have consequently found that when an epoxy resin and a compound having an active hydrogen group which can react with the epoxy resin are added to a polyimide resin having a specific structure, the above problem of polyimide resin can be solved and that when said heat resistant resin is used it is possible to obtain a film adhesive which has excellent heat resistance and which can adhere at a low temperature in a short time, and thus have accomplished the present invention.

According to this invention, there are provided a heat resistant resin composition, which comprises, as the main components:

(A) 100 parts by weight of a polyimide resin which is soluble in an organic solvent and has a glass transition temperature of 350° C. or less, (B) 5 to 100 parts by weight of an epoxy compound having at least two epoxy groups in one molecule, and (C) 0.1 to 20 parts by weight of a compound having an active hydrogen group which can react with the epoxy compound (B);

a heat resistant film adhesive composed essentially of the above components (A) to (C); and a process for producing the heat resistant film adhesive.

One embodiment of this invention is the above-mentioned heat resistant resin composition wherein the component (A) is a polyimide resin containing a diaminosiloxane compound represented by the following general formula (1):

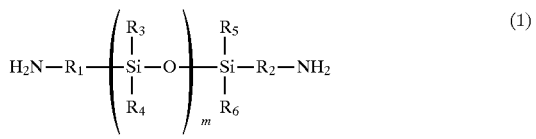

wherein $R_1$ and $R_2$ represent independently divalent aliphatic groups having 1 to 4 carbon atoms or divalent aromatic groups; $R_3$, $R_4$, $R_5$ and $R_6$ represent independently monovalent aliphatic or aromatic groups; and m represents an integer of 1 to 20, in a proportion of 5 to 50 mole % of the total amount of the amine components;
a heat resistant film adhesive composed of the heat resistant resin composition; or
a process for producing the heat resistant film adhesive.

Another embodiment of this invention is the above-mentioned heat resistant resin composition, wherein the component (A) is a polyimide resin composed of 4,4'-oxydiphthalic dianhydride as the main acid component and a diaminosiloxane compound represented by the above general formula (1) and 1,3-bis(3-aminophenoxy)benzene as the main amine components;
a heat resistant film adhesive composed of the above heat resistant resin composition; or
a process for producing the heat resistant film adhesive.

A still another embodiment of this invention is the above heat resistant resin composition wherein the component (A) is a polyimide resin composed of 3,3',4,4'-biphenyltetracarboxylic dianhydride and 3,3',4,4'-benzophenonetetracarboxylic dianhydride as the main acid components and a diaminosiloxane compound represented by the above general formula (1) and at least one diamine selected from the group consisting of 2,2-bis[4-(4-aminophenoxy)phenyl]propane, 1,3-bis(3-aminophenoxy) benzene and dimethylphenylenediamine as the main amine components;
a heat resistant film adhesive composed of the above heat resistant resin composition; or
a process for producing the heat resistant film adhesive.

A further embodiment of this invention is the above heat-resistant resin composition wherein the component (A) is a polyimide resin obtained by mixing: a polyamic acid A obtained by reacting a moles of a siliconediamine represented by the following formula (2):

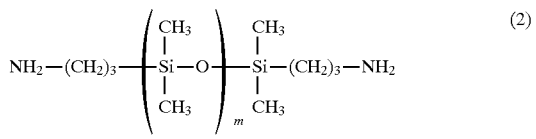

wherein m is an integer of 1 to 13, and b moles of another diamine as the amine components with c moles of at least one tetracarboxylic dianhydride selected from the group consisting of 4,4'-oxydiphthalic dianhydride, 3,3',4,4'-biphenyltetracarboxylic dianhydride and 3,3'4,4'-benzophenonetetracarboxylic dianhydride as the acid component in a proportion satisfying the following relations:

$0.02 \leq a/(a+b) \leq 0.10$ and $0.960 \leq c/(a+b) \leq 1.04$, with a polyamic acid B obtained by reacting d moles of a siliconediamine represented by the above formula (2) and e moles of another diamine as the amine components with f moles of at least one tetracarboxylic dianhydride selected from the group consisting of 4,4'-oxydiphthalic dianhydride, 3,3',4,4'-biphenyltetracarboxylic dianhydride and 3,3',4,4'-benzophenonetetracarboxylic dianhydride as the acid component in a proportion satisfying the following relations:

$0.20 \leq d/(d+e) \leq 0.70$ and $0.920 \leq f/(d+e) \leq 1.10$, in a proportion satisfying the following relation:

$0.12 \leq (a+d)/(a+b+d+e) \leq 0.50$ and imidating the mixture;
a heat resistant film adhesive composed of the heat resistant resin composition; or
a process for producing the heat resistant film adhesive.

A still further embodiment of this invention is the above heat resistant resin composition which further contains (D) 0.1 to 50 parts by weight of a coupling agent;
a heat resistant film adhesive composed of the heat resistant resin composition; or
a process for producing the heat resistant film adhesive.

A still further embodiment of this invention is the above heat resistant resin composition wherein component (D) is a silane coupling agent; a heat resistant film adhesive composed of the heat resistant resin composition; or a process for producing the heat resistant film adhesive.

DETAILED DESCRIPTION OF THE INVENTION

The polyimide resin of this invention is preferably a resin obtained by polymerizing an aromatic diamine with at least one tetracarboxylic dianhydride selected from the group consisting of 3,3',4,4'-biphenyltetracarboxylic dianhydride, 3,3',4,4'-benzophenonetetracarboxylic dianhydride, 4,4'-oxydiphthalic dianhydride and ethylene glycol bistrimellitic dianhydride.

The aromatic diamine to be used in the production of the polyimide resin includes, for example, 2,2-bis[4-(4-aminophenoxy)phenyl]propane, 1,3-bis(3-aminophenoxy)benzene, 2,2-bis[4-(4-aminophenoxy)phenyl]hexafluoropropane, 2,2-bis-(4-aminophenoxy)-hexafluoropropane, bis-4-(4-aminophenoxy)phenylsulfone, bis-4-(3-aminophenoxy)phenylsulfone and the like. These may be used alone or in combination of two or more.

It is preferable that the diamine component of the above polyimide resin contains 5 to 50 mole %, of the total amount of the diamine components, of a diaminosiloxane compound represented by the general formula (1):

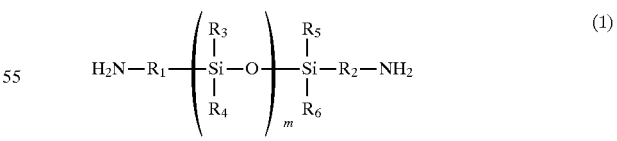

wherein $R_1$ and $R_2$ are independently divalent aliphatic groups having 1 to 4 carbon atoms or divalent aromatic groups; $R_3$, $R_4$, $R_5$ and $R_6$ are independently monovalent aliphatic or aromatic groups; and m is an integer of 1 to 20.

It is also preferable that in the polyimide resin of this invention, the main acid component is 4,4'-oxydiphthalic dianhydride; as the other acid component, there is used at least one tetracarboxylic dianhydride selected from the group consisting of 3,3',4,4'-biphenyltetracarboxylic dianhydride, 3,3',4,4'-benzophenonetetracarboxylic dianhydride and ethylene glycol bistrimellitic dianhydride in such an amount as not to exceed 50 mole % of the total amount of the acid components; and the main amine component is a combination of 1,3-bis(3-aminophenoxy)benzene with the diaminosiloxane compound represented by the general formula (1).

In this case, as the other amine component, for example, 1,4-bis(3-aminophenoxy)benzene, 1,4-bis[2-(4-aminophenyl)propyl]benzene, 1,4-bis(4-aminophenoxy)benzene, 2,2-bis[4-(4-aminophenoxy)phenyl]propane, 2,2-bis[4-(4-aminophenoxy)phenyl]hexafluoropropane, 2,2-bis(4-aminophenoxy)hexafluoropropane, bis-4-(4-aminophenoxy)phenylsulfone, bis-4-(3-aminophenoxy)phenylsulfone or the like can be used alone or in combination of two or more in such an amount not to exceed 50 mole % of the total amount of the diamine components.

It is also preferable to use, as the polyimide resin of this invention, a resin composed of 3,3',4,4'-biphenyltetracarboxylic dianhydride and 3,3',4,4'-benzophenonetetracarboxylic dianhydride as the main acid components; and at least one diamine selected from the group consisting of 2,2-bis[4-(4-aminophenoxy)phenyl]propane, 1,3-bis(3-aminophenoxy)benzene and dimethylphenylenediamine, and a diaminosiloxane compound represented by the general formula (1) as the main amine components.

When the acid components are a moles of 3,3',4,4'-biphenyltetracarboxylic dianhydride and b moles of 3,3',4,4'-benzophenonetetracarboxylic dianhydride; and the amine components are c moles of 2,2-bis[4-(4-aminophenoxy)phenyl]propane, d moles of at least one diamine selected from the group consisting of 1,3-bis(3-aminophenoxy)benzene and dimethylphenylenediamine and e moles of a diaminosiloxane compound represented by the general formula (1), it is preferable that a, b, c, d, and e satisfy the relations:

$$0.5 \leq a/(a+b) \leq 0.8,$$

$$0.2 \leq b/(a+b) \leq 0.5 \text{ and}$$

$$0.05 \leq e/(c+d+e) \leq 0.5.$$

As the other acid component, it is possible to co-use at least one tetracarboxylic dianhydride selected from the group consisting of 4,4'-oxydiphthalic dianhydride and ethylene glycol bistrimellitic dianhydride in such an amount as not to adversely affect the characteristics. As the other amine component, it is also possible to use 2,2-bis[4-(4-aminophenoxy)phenyl]-hexafluoropropane, 2,2-bis(4-aminophenoxy)hexafluoropropane, bis-4-(4-aminophenoxy)phenylsulfone, bis-4-(3-aminophenoxy)phenylsulfone and the like alone or in combination of two or more in such an amount as not to adversely affect the characteristics.

In any of the above cases, it is preferable to use the diaminosiloxane compound in an amount of 5 to 50 mole % of the total amount of the diamine components. When the amount of the diaminosiloxane compound is less than 5 mole % of the total amount of the diamine components, the solubility in an organic solvent becomes low, and when it exceeds 50 mole %, the glass transition temperature becomes remarkably low to cause a problem in respect of heat resistance. Specifically, the diaminosiloxane compound of the general formula (1) is preferably α,ω-bis(3-aminopropyl)polydimethylsiloxane (APPS) represented by the following formula (2):

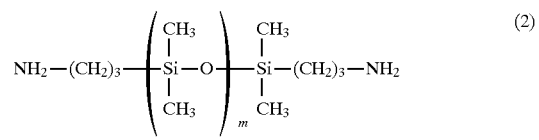

wherein m is an integer of 1 to 13. It is particularly preferable that the value of m is in the range of 4 to 10 in view of glass transition temperature, adhesiveness and heat resistance. These siloxane compounds may be used alone or in combination of two or more. Particularly, a blend of the compound of m=1 with the compound of m=4–10 is preferably applied to a use in which adhesiveness is an important factor.

Moreover, as the polyimide resin of this invention, there may be preferably used those obtained by mixing a polyamic acid having a low silicone content with a polyamic acid having a high silicone content in the form of solutions and then imidizing the mixture. This is characterized in that in the mixed polyimide resin obtained by mixing two kinds of polyamic acids, trade off characteristics can be realized by allowing the portion derived from the polyamic acid having a low silicone content to bear heat resistance, particularly excellent mechanical strength at high temperatures and allowing the portion derived from the polyamic acid having a high silicone content to bear excellent characteristics of silicone-modified product such as low moisture absorbability, adhesiveness and the like. Moreover, by conducting the imidization after mixing in the amic acid form, it is made possible to prevent the separation of the two components and assure the solvent-solubility.

Speaking in more detail, there can be preferably used a polyimide resin characterized by being produced by mixing: a polyamic acid A having a low silicone content in which a moles of a silicone diamine represented by the formula (2) and b moles of another diamine are used as the amine components; and c moles of at least one tetracarboxylic dianhydride selected from the group consisting of 4,4'-oxydiphthalic dianhydride, 3,3',4,4'-biphenyltetracarboxylic dianhydride and 3,3',4,4'-benzophenonetetracarboxylic dianhydride is used as the acid component wherein a, b and c satisfy the relations:

$$0.02 \leq a/(a+b) \leq 0.10 \text{ and}$$

$$0.960 \leq c/(a+b) \leq 1.04,$$

with a polyamic acid B having a high silicone content in which d moles of the silicone diamine represented by the formula (2) and e moles of another diamine are used as the amine components; and f moles of at least one tetracarboxylic dianhydride selected from the group consisting of 4,4'-oxydiphthalic dianhydride, 3,3',4,4'-biphenyltetracarboxylic dianhydride and 3,3',4,4'-benzophenonetetracarboxylic dianhydride is used as the acid components wherein d, e and f satisfy the following relations:

$$0.20 \leq d/(d+e) \leq 0.70 \text{ and}$$

$$0.920 \leq f/(d+e) \leq 1.10$$

in the solution form so that a b, d and e satisfy the following relation:

$$0.12 \leq (a+d)/(a+b+d+e) \leq 0.50$$

and thereafter imidizing the mixture.

More preferable is a polyimide resin characterized in that in the polyamic acid A, said other diamine component which is used along with the siliconediamine is a combination of h moles of at least one diamine represented by the general formula (3):

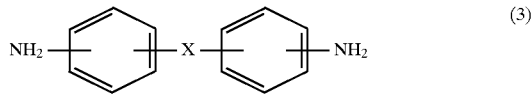

wherein X is a divalent organic group, for example, 2,2-bis [4-(4-aminophenoxy)phenyl]propane or 4,4'-diaminodiphenylmethane, with i moles of at least one diamine represented by the general formula (4):

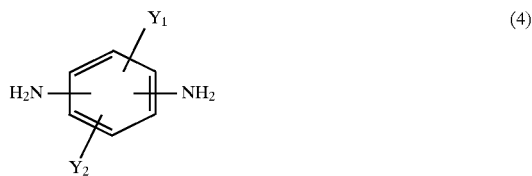

wherein $Y_1$ and $Y_2$ are independently H or alkyl groups, for example, p-toluenediamine, 4,6-dimethyl-m-phenylenediamine or 2,5-dimethyl-p-phenylenediamine; and in the polyamic acid B, said other diamine component which is used along with the siliconediamine is a combination of j moles of at least one diamine represented by the general formula (3) with k moles of at least one diamine represented by the general formula (4), wherein h, i, j and k satisfy the relation:

$$0.1 \leq (h+j)/(i+k) \leq 10.$$

As the tetracarboxylic dianhydride used in this invention, there are preferably used 4,4'-oxydiphthalic dianhydride, 3,3',4,4'-biphenyltetracarboxylic dianhydride and 3,3',4,4'-benzophenonetetracarboxylic dianhydride in view of the balance of solvent-solubility and heat resistance. These tetracarboxylic dianhydrides may be used alone or in combination of two or more. The tetracarboxylic dianhydrides constituting the two kinds of polyamic acids to be mixed may be the same as or different from each other and the proportions of the tetracarboxylic dianhydrides in the polyamic acids may be the same as or different from each other.

The siliconediamine represented by the formula (2) used in this invention is α,ω-bis(3-aminopropyl) polydimethylsiloxane or the like, m is preferably 1 to 13, particularly preferably 4 to 10, in view of glass transition temperature, adhesiveness and heat resistance. It is also preferable to use a blend of the siliconediamine having m=1 with the silicone-diamine having m=4–10 particularly in a use in which adhesiveness is an important factor.

The diamine represented by the general formula (3) includes 2,2-bis[4-(4-aminophenoxy)phenyl]propane, 2,2-bis[4-(4-aminophenoxy)phenyl]-hexafluoropropane, 2,2-bis-(4-aminophenoxy)hexafluoro-propane, bis-4-(4-aminophenoxy)phenylsulfone, bis-4-(3-aminophenoxy) phenylsulfone, 1,3-bis(3-aminophenoxy)benzene, 1,4-bis(3-aminophenoxy)benzene, 1,4-bis(4-aminophenoxy)benzene, 4,4'-diaminodiphenyl ether, 3,4'-diaminodiphenyl ether, 4,4'-diaminodiphenylsulfone, 3,3'-diaminodiphenylsulfone, 4,4'-diaminodiphenyl-methane, 4,4'-bis(4-aminophenoxy) biphenyl and the like. Among them, diamines having an aminophenoxy structure are preferable in an application field in which adhesiveness is an important factor.

The diamine represented by the general formula (4) includes o-phenylenediamine, m-phenylenediamine, p-phenylenediamine and monoalkyl- and dialkyl-ring substituted derivatives thereof. In the case where heat resistance is an important factor, it is particularly preferable to use diamines having p-phenylenediamine skeleton. The ratio of the amounts of the diamines represented by the general formulas (3) and (4), namely (h+j)/(i+k) is preferably in the range of $0.1 \leq (h+j)/(i+k) \leq 10$ from the viewpoint of balance of processability such as solubility, heat resistance, adhesiveness and the like. Ratios outside this range are not desirable because the solvent-solubility is lost and no improvement effect on heat resistance is confirmed.

The mole ratios of the diamines and the acids must satisfy the relations:

$$0.02 \leq a/(a+b) \leq 0.10 \text{ and}$$

$$0.960 \leq c/(a+b) \leq 1.04$$

in the case of the polyamic acid having a low silicone content. When the mole ratio of the siliconediamine is less than 0.02, the feature of solvent-solubility of the mixed polyimide resin obtained is lost, and when it exceeds 0.10, the heat resistance of the mixed polyimide resin obtained is lowered, so that said mole ratios are not desirable. Also, when the acid/amine mole ratio is outside the above range, the molecular weight of the polyimide resin obtained becomes low and the object of bearing mechanical strength is not achieved, so that said mole ratio outside the range is not desirable.

In the polyamic acid having a high silicone content, the mole ratios of the diamines and the acids must satisfy the relations:

$$0.20 \leq d/(d+e) \leq 0.70 \text{ and}$$

$$0.920 \leq f/(d+e) \leq 1.10.$$

When the mole ratio of the siliconediamine is less than 0.20, it becomes impossible to develop the excellent characteristics of the silicone-modification in the mixed polyimide resin obtained, and when it exceeds 0.70, the mechanical strength of the mixed polyimide resin obtained is remarkably lowered, so that said ratios are not desirable.

Also, when the acid/amine mole ratio is outside the above range, the molecular weight of the polyimide resin obtained becomes low, and hence the heat resistance of the mixed polyimide resin is remarkably lowered, which is not preferable.

Furthermore, it is preferable to mix the above two polyamic acids so that the mole ratio of the total siliconediamine becomes $0.12 \leq (a+d)/(a+b+d+e) \leq 0.50$, more preferably $0.20 \leq (a+d)/(a+b+d+e) \leq 0.50$. It is important that the mole ratio falls within the above range, and when the mole ratio of the siliconediamine is less than 0.12, low moisture absorption, solubility, adhesiveness and the like which are excellent characteristic features of silicone-modification do not appear, and when it exceeds 0.50, the mechanical strength at high temperatures is remarkably lowered and a problem is caused in heat resistance.

The equivalent ratio of the acid component to the amine component in the polycondensation reaction is an important factor for determining the molecular weight of the polyamic acid obtained. It is well-known that there is a correlation between the molecular weight of a polymer and the physical properties of the polymer, particularly between the number average molecular weight and the mechanical properties. The larger the number average molecular weight, the better the mechanical properties. Accordingly, in order to obtain a practically excellent strength, it is necessary that the molecular weight be high to some extent. In this invention, the equivalent ratio r of the acid component to the amine component is preferably in the range of:

$$0.900 \leq r \leq 1.06,$$

more preferably in the range of:

$$0.975 \leq r \leq 1.025,$$

provided that r=[number of equivalents of total acid component]/[number of equivalents of total amine component]. When r is less than 0.900, the molecular weight is low and the polymer becomes brittle, and hence, the bonding strength becomes weak. Also, when r exceeds 1.06, the unreacted carboxylic acid undergoes decarboxylation under heating to generate a gas, whereby foaming is caused. This is not desirable in some cases.

The addition of a dicarboxylic anhydride or a monoamine for controlling the molecular weight of the polyimide resin is not particularly objectionable as far as the acid/amine mole ratio falls within the above-mentioned range.

The reaction of the tetracarboxylic dianhydride with the diamine is carried out in an aprotic polar solvent in a known manner. The aprotic polar solvent includes N,N-dimethylformamide (DMF), N,N-dimethylacetamide (DMAC), N-methyl-2-pyrrolidone (NMP), tetrahydrofuran (THF), diglyme, cyclohexanone, 1,4-dioxane (1,4-DO) and the like. The aprotic polar solvents may be used alone or in admixture of two or more. In this case, the aprotic polar solvent may be used in admixture with a nonpolar solvent compatible therewith. As the nonpolar solvent, an aromatic hydrocarbon is preferably used such as toluene, xylene, solvent naphtha or the like. The proportion of the nonpolar solvent in the mixed solvent is preferably 30% by weight or less. This is because when the proportion of the nonpolar solvent is more than 30% by weight, there is a fear that the dissolving power of the solvent may be reduced whereby the polyamic acid may be precipitated. When the tetracarboxylic dianhydride is reacted with the diamine, the diamine component is well dried and dissolved in the above-mentioned reaction solvent which has been subjected to dehydration-purification, and to the solution is added the well-dried tetracarboxylic dianhydride which has a ring-closure percentage of 98% or more, preferably 99% or more, after which the mixture is subjected to the reaction.

The polyamic acid solution thus obtained is subsequently subjected to heat-dehydration-cyclization in an organic solvent to imidize the polyamic acid into a polyimide. The water generated by the imidization reaction inhibits the cyclization reaction, so that an organic solvent which is not compatible with water is added to the system and the mixture is subjected to azeotropic distillation to discharge the water out of the system through a means such as a Dean-Stark tube or the like. As the organic solvent which is not compatible with water, dichlorobenzene is known; however, when this is used, there is a fear that a chlorine component may be mixed into the product. This is not desirable in the field of electronics, so that the above-mentioned aromatic hydrocarbon is preferably used for electronics. Anhydrous acetic acid, β-picoline, pyridine or the like may be used as a catalyst for the imidization reaction.

In this invention, the higher the degree of imide-ring closure, the better, and when the degree of imidization is low a further imidization is caused by the heat generated during the use to produce water, which is not desirable. Therefore, it is preferable that the degree of imidization reaches 95% or more, more preferably 98% or more.

The epoxy compound (B) used in the heat resistant resin composition of this invention may be any epoxy compound as far as it has at least two epoxy groups in one molecule and is compatible with the polyimide resin (A); however, it is preferable that the epoxy compound has a good solubility in the solvent for the polyimide resin (A). There are mentioned, for example, bisphenol A type diglycidyl ether, bisphenol F type diglycidyl ether, phenol-novolak type epoxy resin, biphenyl type epoxy compound and the like.

The amount of the above epoxy compound is preferably 5 to 100 parts by weight, more preferably 10 to 70 parts by weight, per 100 parts by weight of the polyimide resin (A). When the amount is less than 5 parts by weight, there can hardly be obtained such an effect as to lower the softening point of the resin composition and increase the low-temperature processability by adding an uncured epoxy compound, and when it exceeds 100 parts by weight, it follows that the heat resistance of the polyimide resin is impaired. Such amounts outside the range are not desirable.

The compound having an active hydrogen group which can react with the epoxy compound (C), used in the heat resistant resin composition of this invention, is preferably one which has a good compatibility with the polyimide resin (A) and the epoxy compound (B) and has a good solubility in a solvent for the polyimide resin. For example, resol, novolak, amine compound and the like are included therein. The proportion of the component (C) blended is 0.1 to 20 parts by weight, preferably 0.5 to 10 parts by weight, per 100 parts by weight of the polyimide resin (A). When the proportion is less than 0.1 part by weight, the conversion of the uncured epoxy compound becomes extremely low and the desired effect of this invention does not appear. Also, the control of the flow of the resin becomes difficult when the elasticity of the resin at high temperatures is low. When the proportion exceeds 20 parts by weight, the resin in the form of a solution tends to cause a gel, the processability is impaired and the heat resistance of the resin composition is impaired, so that these proportions outside the range are not desirable.

The heat resistant resin composition of this invention may contain (D) a coupling agent in addition to the above components (A), (B) and (C). In this case, the coupling agent (D) is preferably one which has a good compatibility with the polyimide resin (A) and the epoxy compound (B) and a good solubility in a solvent for the polyimide resin. For example, silane type coupling agents, titanium type coupling agents, zircon type coupling agents and the like are included therein. In particular, silane type coupling agents are preferable in respects of compatibility and solubility. The proportion of the coupling agent contained is preferably 0.1 to 50 parts by weight, more preferably 0.5 to 30 parts by weight, per 100 parts by weight of the polyimide resin (A). When the above proportion is less than 0.1 part by weight and when the resin composition is used in an adhesive use, such an effect does not appear that intimate adhesion to an adherend is improved, and when it exceeds 50 parts by weight, the heat resistance of the resin composition is impaired, so that said proportions outside the range are not desirable.

The heat resistant resin composition of this invention may contain a fine inorganic filler in such an amount that the processability and heat resistance of the composition are not damaged.

In this invention, it is possible to directly add, to the obtained polyimide solution per se, the epoxy compound and the compound having an active hydrogen group which can react with the epoxy compound, to prepare a heat resistant resin composition solution. Also, it is possible to pour the polyimide resin solution into a poor solvent to precipitate the polyimide resin, remove the unreacted monomers to purify the polyimide resin, then dry the polyimide resin and use the same as a solid polyimide resin. In uses in which a high temperature step is hated, particularly in uses in which impurities and foreign matters become a problem, it is preferable to dissolve the solid resin in an organic solvent again and filter and purify the solution to prepare a varnish. In this case, the solvent used is preferably selected from solvents having low boiling points taking its processability into consideration.

As the low-boiling solvent having a boiling point of 200° C. or less for the polyimide resin of this invention, there can be used ketone solvents such as acetone, methyl ethyl ketone, methyl isobutyl ketone, cyclopentanone and cyclohexanone; and ether solvents such as 1,4-dioxane, tetrahydrofuran and diglyme. These solvents may be used alone or in admixture of two or more. Alternatively, said low-boiling solvent may be added to the polyimide resin solution and the resulting solution may be used.

The resin varnish may, if necessary, have added thereto various additives such as a smoothing agent, a leveling agent, a defoaming agent and the like. Also, in order to adjust the vaporization speed of the solvent, an aromatic hydrocarbon solvent can be used in such an amount that the same is dissolved uniformly.

The film adhesive to be formed from the resin varnish in this invention is obtained by casting or coating the resin varnish. For example, a film layer of the resin varnish can be formed on one or both sides of a heat resistant film substrate as a support and the resulting assembly as such can be used as the film adhesive, or a film can be formed by applying the resin varnish onto a release sheet such as a roll, a metal sheet, a polyester sheet or the like by means of a flow coater, a roll coater or the like, heat-dried and thereafter peeled from the release sheet to prepare a film adhesive.

The heat resistant film substrate used in this invention is preferably a polyimide resin film because it has a small thermal expansion coefficient, and is excellent in dimension stability against temperature change, rich in flexibility, easy to handle and excellent in adhesion to the resin of this invention. In particular, a polyimide resin having a glass transition temperature of 350° C. or more is excellent in workability and stability in the step of drying the coated varnish.

In the coating and drying of the resin varnish, there can be used an apparatus in which a coating means such as flow coater, roll coater or the like is combined with a hot-air drying oven, or the like. After the coating of the resin varnish on a support, the resulting assembly is introduced into the hot-air drying oven, in which the coating is dried at a temperature and air flow enough to volatilize the solvent of the varnish.

The method of use of the film adhesive of this invention is not particularly limited; and, it can be used as an adhesive tape prepared by cutting the film adhesive into the desired shape, which is bonded to some adherend by a hot press.

The heat resistant resin composition obtained by adding, to the polyimide resin of this invention, an epoxy compound and a compound having an active hydrogen group which can react with the epoxy compound, and a film adhesive comprising said resin composition as the main resin component have an apparent glass transition temperature lower than the glass transition temperature of the polyimide resin and have an improved low-temperature processability. On the other hand, the adhesions of the resin composition and the film adhesive in a higher temperature zone than the glass transition temperature of the polyimide resin are improved as compared with that of the polyimide resin, and the physical properties in a high temperature zone are so improved that even when a thermal shock such as IR reflow or the like is applied, no delamination is observed. The detailed mechanism of this peculiar phenomenon has not completely been clarified; however, it seems that a low molecular weight product formed by reaction between the epoxy compound and the compound having an active hydrogen group acts as a plasticizer on the polyimide resin having the specific structure to lower modulus of the polyimide resin in the lower temperature zone than the glass transition temperature of the polyimide resin, thereby bringing about an improvement in workability at a low temperature such as adhesiveness, processability and the like. On the other hand, in a higher temperature zone than the glass transition temperature, it is considered that a three-dimensional reticular structure is formed by heat given in said zone to lower the flow properties of the polyimide resin, thereby keeping or improving the heat resistance of the polyimide resin. By the above-mentioned mechanism, low-temperature processability and heat resistance reliability at high temperature are achieved simultaneously.

According to this invention, a highly reliable film adhesive which has both heat resistance and processability can be provided. The film adhesive is soluble in a solvent having a low boiling point, so that it is possible to vaporize the residual solvent substantially completely, and since the adhesive has already been imidized, no high temperature step for imidization is required in processing and hence water is not generated. Also, the film adhesive can be used as a tack-free film, so that the film adhesive is very effective for uses requiring continuous workability and clean circumstances. Therefore, the film adhesive has a very high utilization value in industry as an electronic material requiring high reliability and heat resistance.

The method of using the resin composition of this invention is not particularly limited; and, the resin composition can be used in coating and dipping as a resin varnish in which all the resin constituents are uniformly dissolved in an organic solvent, can be formed into a film by a casting method, and also can be used as an insulating material, an adhesive film or the like in which both heat resistance and processability are satisfied.

DESCRIPTION OF REFERRED EMBODIMENTS OF THIS INVENTION

This invention is explained below in detail referring to Examples; however, this invention should not be construed to be limited thereto.

[Synthesis of polyimide resin PI-1]

In a four-necked flask equipped with a dry nitrogen-introducing tube, a condenser, a thermometer and a stirrer was placed 791 g of dehydration-purified NMP, and vigorous stirring was conducted while a nitrogen gas was allowed to flow for ten minutes. Subsequently, 73.8926 g (0.180 mole) of 2,2-bis[4-(4-aminophenoxy)phenyl]propane (BAPP), 17.5402 g (0.060 mole) of 1,3-bis(3-aminophenoxy)benzene (APB) and 50.2200 g (0.060 mole) of α,ω-bis(3-aminopropyl)polydimethylsiloxane having an average molecular weight of 837 [APPS represented by the formula (2)] were poured into the flask, after which the system was heated to 60° C. and stirred until the system became uniform. After uniform dissolution, the system was cooled to 5° C. in an ice water bath, and 44.1330 g (0.150 mole) of 3,3',4,4'-biphenyltetracarboxylic dianhydride (BPDA) and 61.5445 g (0.150 mole) of ethylene glycol bistrimellitic dianhydride (TMEG) in the form of powder were added to the solution in fifteen minutes, after which the stirring was continued for three hours, during which the flask was kept at 5° C.

Thereafter, the nitrogen gas-introducing tube and the condenser were taken apart from the flask and the flask was fitted with a Dean-Stark tube filled with xylene, after which 198 g of the xylene was added to the system. The system was heated to 175° C. in an oil bath to remove the water generated out of the system. The heating was conducted for four hours, upon which the generation of water from the system was not observed. After cooling, the reaction mixture was poured into a large amount of methanol to precipitate a polyimide resin. The solid content was separated by filtration and then dried at 80° C. for 12 hours under reduced pressure to remove the solvent, whereby 227.79 g (yield: 92.1%) of a solid resin was obtained. The infrared absorption spectrum was measured by a KBr tablet method to observe absorption at 5.6 $\mu$m due to cyclic imide bond; however, no absorption at 6.06 $\mu$m due to amide bond was observed. Therefore, it was confirmed that the above resin was substantially 100% imidized.

The polyimide resin thus obtained was confirmed to have a glass transition temperature of 148° C. and a tensile modulus of 180 kgf/mm$^2$ and to be well soluble in dimethylformamide (DME), 1,4-dioxane (1,4-DO) and tetrahydrofuran (THF).

[Synthesis of polyimide resins PI-2 and PI-3]

In the same manner as in the synthesis of polyimide resin PI-1, polyimide resins PI-2 and PI-3 were obtained.

The physical properties of the polyimide resins PI-1, PI-2 and PI-3 obtained are shown in Table 1.

Incidentally, the abbreviations used in Tables 1 to 3 have the following meanings:
BTDA: 3,3',4,4'-Benzophenonetetracarboxylic dianhydride
ODPA: 4,4'-Oxydiphthalic dianhydride
DPX: 2,5-Dimethyl-p-phenylenediamine
APDS: 1,3-Bis(3-aminopropyl)tetramethyldisiloxane (in the formula (2), m=1)
APB: 1,3-Bis(3-aminophenoxy)benzene
BPDA: 3,3',4,4'-Biphenyltetracarboxylic dianhydride.
PPA: para-phenoxy aniline In the "Solubility" section, "S" shows that the resin was dissolved in the corresponding solvent. The glass transition temperature was determined by the DSC measurement. The tensile test was conducted at room temperature at a drawing speed of 5 mm/min. The Young's modulus was determined by a viscoelastospectro-meter.

[Synthesis of polyimide resins PI-4, PI-5, PI-6 & PI-7]

In the same manner as in the synthesis of polyimide resin PI-1, polyimide resins PI-4, PI-5, PI-6 and PI-7 were produced. The physical properties of the thus obtained polyimide resins PI-4, PI-5, PI-6 and PI-7 are shown in Table 2.

TABLE 1

| | | PI-1 | PI-2 | PI-3 |
|---|---|---|---|---|
| Recipe | | | | |
| Acid compo-nent (mole ratio) | BPDA | 50 | 60 | — |
| | BTDA | — | 40 | 30 |
| | ODPA | — | — | 70 |
| | TMEG | 50 | — | — |
| Amine compo-nent (mole ratio) | BAPP | 60 | 20 | 65 |
| | APB | 20 | 55 | — |
| | DPX | — | — | 20 |
| | APPS | 20 | 23 | 15 |
| | APDS | — | 2 | — |
| Acid/amine equivalent ratio (r) | | 1.00 | 1.00 | 1.00 |
| Item Solubility* | | | | |
| DMF | | S | S | S |
| 1,4-DO | | S | S | S |
| THF | | S | S | S |
| Glass transition temp. (°C.) | | 148 | 133 | 176 |
| Tensile modulus (kgf/mm$^2$) | | 180 | 170 | 219 |
| Elongation (%) | | 6.02 | 5.81 | 5.94 |
| Tensile strength (kgf/mm$^2$) | | 5.33 | 5.13 | 5.82 |
| Young's modulus | | | | |
| @ 30° C. GPa | | 2.05 | 1.58 | 1.94 |
| @ 250° C. MPa | | <0.5 | <0.5 | 0.80 |

Note:
*"S" means "soluble".

TABLE 2

| Item | | PI-4 | PI-5 | PI-6 | PI-7 |
|---|---|---|---|---|---|
| Recipe | | | | | |
| Acid compo-nent (mole ratio) | ODPA | 100 | 80 | 100 | — |
| | BPDA | — | — | — | 50 |
| | BTDA | — | 20 | — | 50 |
| Amine compo-nent (mole ratio) | APB | 70 | 40 | 90 | — |
| | BAPP | 15 | 40 | — | 39 |
| | APPS | 15 | 20 | 8 | 30 |
| | APDS | — | — | 2 | — |
| | DPX | — | — | — | 30 |
| | PPA | — | — | — | 2 |
| Acid/amine equivalent ratio (r) | | 1.00 | 1.00 | 0.98 | 1.00 |
| Solubility* | | | | | |
| DMF | | S | S | S | S |
| 1,4-DO | | S | S | S | S |
| THF | | S | S | S | S |
| Glass transition temp. (°C.) | | 151 | 138 | 150 | 158 |
| Tensile modulus (kgf/mm$^2$) | | 211 | 196 | 205 | 229 |
| Elongation (%) | | 5.52 | 4.91 | 5.73 | 5.83 |
| Tensile strength (kgf/mm$^2$) | | 6.11 | 5.72 | 6.21 | 5.62 |
| Young's modulus | | | | | |
| @ 30° C. GPa | | 1.62 | 1.34 | 2.25 | 1.54 |
| @ 250° C. MPa | | <0.5 | <0.5 | 1.18 | 0.60 |

Note:
*"S" means "soluble".

[Synthesis of polyimide resin PI-8]

(1) Preparation of polyamic acid A

In a four-necked flask equipped with a dry nitrogen-introducing tube, a condenser, a thermometer and a stirrer was placed 213 g of dehydration-purified NMP, and vigorous stirring was conducted for ten minutes while a nitrogen gas was allowed to flow. Subsequently, 25.4519 g (0.0620 mole) of 2,2-bis[4-(4-aminophenoxy)phenyl]propane (BAPP), 4.2221 g (0.0310 mole) of 2,5-dimethyl-p-phenylenediamine (DPX) and 5.8590 g (0.0070 mole) of α,ω-bis(3-aminopropyl)polydimethylsiloxane (APPS) having an average molecular weight of 837 were poured into the flask and the system was heated to 60° C. and stirred until the system became uniform. After uniform dissolution, the system was cooled in an ice-water bath to 5° C. and to the solution was added 31.0222 g (0.1000 mole) of 4,4'-oxydiphthalic dianhydride (ODPA) in the form of powder in ten minutes and thereafter stirring was continued for five hours to obtain a polyamic acid solution, during which the flask was kept at 5° C.

(2) Preparation of polyamic acid B

In the same manner as in the preparation of polyamic acid A, 303.6 g of NMP was vigorously stirred for ten minutes while a nitrogen gas was allowed to flow. Subsequently, 11.4944 g (0.0280 mole) of 2,2-bis[4-(4-aminophenoxy) phenyl]propane, 1.9067 g (0.0140 mole) of 2,5-dimethyl-p-phenylenediamine and 48.5460 g (0.0580 mole) of α,ω-bis (3-aminopropyl)polydimethyl-siloxane having an average molecular weight of 837 were poured into the NMP, and the system was heated to 60° C. and stirred until the system became uniform. After uniform dissolution, the system was cooled to 5° C. in an ice-water bath and then 31.0222 g (0.1000 mole) of 4,4'-oxydiphthalic dianhydride was added in the form of powder to the solution in ten minutes, after which stirring was continued for five hours, during which the flask was kept at 5° C.

(3) Preparation of polyimide resin

The same weights of polyamic acid A and polyamic acid B were weighed and placed in a flask. At this time, the average amount of siliconediamine was 32.5 mole % of the total amount of the amine components. The nitrogen gas-introducing tube and the condenser were taken apart from the flask and the flask was fitted with a Dean-Stark tube filled with xylene, after which the xylene was fed to the flask. The ice-water bath was replaced with an oil bath and the system was heated while the water generated was taken out of the system. When the system was heated for four hours, the generation of water was not observed. After cooling, the reaction mixture was poured into a large amount of methanol to precipitate a polyimide resin. The solid content was separated by filtration and dried under reduced pressure at 80° C. for 12 hours to obtain a solid resin. The infrared absorption spectrum of the resin was measured by a KBr tablet method to confirm absorption due to cyclic imido bond at 5.6 μm; however, no absorption due to amido bond at 6.06 μm was not confirmed. Thus, it was confirmed that the resin was approximately 100% imidized. The acid/amine mole ratios at this time were as follows:

$b=h+i$, $a/(a+b)=0.07$, $c/(a+b)=1$, $e=j+k$, $d/(d+e)=0.58$, $(h+j)/(i+k)=2$, $f/(d+e)=1$, $(a+d)/(a+b+d+e)=0.325$.

It was confirmed that the polyimide resin thus obtained was well dissolved in dimethylformamide (DMF), 1,4-dioxane (1,4-DO) and tetrahydrofuran (THF). The glass transition temperature was 166° C. and the tensile modulus was 215 kgf/mm².

[Synthesis of polyimide resin PI-9]

In the same manner as in the synthesis of polyimide resin PI-8, polyimide resin PI-9 was obtained. The results of evaluation of these polyimide resins are shown in Table 3.

TABLE 3

| | PI-8 | | PI-9 | |
|---|---|---|---|---|
| Item Monomers | Polyamic acid A | Polyamic acid B | Polyamic acid A | Polyamic acid B |
| BAPP | 62 | 28 | | |
| APB | | | 55 | 30 |
| DPX | 31 | 14 | 37 | 20 |
| APPX | 7 | 58 | 8 | 50 |
| ODPA | 100 | 100 | 30 | 27.5 |
| BPDA | | | 72.5 | 70 |
| Mole ratio | | | | |
| a/(a + b) | 0.07 | | 0.08 | |
| c/(a + b) | 1.00 | | 1.025 | |
| d/(d + e) | | 0.58 | | 0.50 |
| f/(d + e) | | 1.00 | | 0.975 |
| Mole ratio after mixing | | | | |
| (h + j)/(i + k) | 2.0 | 1.49 | | |
| (a + d)/(a + b + d + e) | 0.325 | 0.29 | | |
| Solubility* | | | | |
| DMF | S | S | | |
| 1,4-DO | S | S | | |
| THF | S | S | | |
| Glass transition temp. (°C.) | 166 | 142 | | |
| Tensile modulus (kgf/mm²) | 215 | 198 | | |
| Elongation (%) | 4.72 | 5.28 | | |
| Tensile strength (kgf/mm²) | 6.77 | 6.54 | | |
| Young's modulus | | | | |
| @ 30° C. GPa | 1.52 | 1.62 | | |
| @ 250° MPa | <0.5 | 0.64 | | |

Note:
*"S" means "soluble".

Example 1

In a glass flask were placed 100 g of polyimide resin PI-1 and 355 g of DMF, and they were sufficiently stirred at room temperature to completely dissolve the polyimide resin in DMF. After the uniform dissolution, 40 g of a bisphenol A type epoxy compound (Epikote 828 manufactured by Yuka Shell Epoxy, Co., Ltd.) was added to the solution and the resulting mixture was stirred for two hours at room temperature. After it was confirmed that the epoxy compound was uniformly dissolved, 5.0 g of a resol resin (PR-50781 manufactured by Sumitomo Durez, Co., Ltd.) was gradually added while the system was stirred. The stirring was continued for a further two hours to prepare a heat resistant resin solution. This solution composition did not gel and was kept in a uniform solution state even when allowed to stand at room temperature for five days.

The resin solution thus obtained was coated on a planished stainless steel plate by means of a doctor blade to obtain a film having a thickness of 50 μm. The drying temperature was at most 195° C. and the drying time was 20 minutes. Solubility, glass transition temperature, tensile characteristics and Young's modulus are shown in Table 4.

This varnish was coated on one side of a polyimide film (Upilex SGA having a thickness of 50 μm, a trade name of Ube Industries, Ltd.) by means of a reverse roll coater, to obtain an adhesive tape in which the thickness of the adhesive layer was 30 μm. The drying temperature was at most 200° C. and the drying time was 15 minutes. This adhesive tape was subjected to thermal compression bonding to a plate of 42 alloy to prepare a test piece (Thermal compression bonding was effected at 250° C. for two seconds and after release of pressure, annealing was effected at 250° C. for 30 seconds. The pressure applied to the bonding surface was 4 kgf/cm$^2$ as calculated from gauge pressure and bonding area). The results obtained by measuring a 180° peel strength in a tensile tester are shown in Table 4. The bonding strength is the result of measuring a 180° peal strength (drawing speed: 50 mm/min) at room temperature in the normal state and after the treatment in a pressure cooker (125° C., 48 hours, R. H. 100%). At the ruptured cross-section of the test piece, the bonded resin layer underwent cohesive failure and no bubble or void was found.

Example 2

The same varnish as in Example 1 was coated on a biaxially oriented polyester film (Diafoil having a thickness of 50 μm, a trade name of Diafoil Hoechst Co., Ltd.) by means of a reverse roll coater, and after drying, was peeled from the polyester film to obtain a uniform monolayer film adhesive having a thickness of 30 μm free from support. Peeling was easy and no particular trouble was caused. The results of bonding to a plate of 42 alloy in the same manner as in Example 1 are shown in Table 4.

Examples 3 to 6

In the same manner as in Examples 1 and 2, resin solutions were prepared with the recipes shown in Table 4 and a film and an adhesive tape were obtained. The evaluation results obtained are shown in Table 4.

Incidentally, the abbreviations shown in Tables 4 to 10 have the following meanings:

S in the "Solubility" section means that the resin was dissolved in the corresponding solvent. The glass transition temperature was determined by a DSC measurement. The tensile test was conducted at room temperature at a drawing speed of 5 mm/min.

YX-4000H: Biphenyl type epoxy compound, Epikote YX-4000H manufactured by Yuka Shell Epoxy Co., Ltd.
EOCN-1020: Phenol-novolak type epoxy compound, EOCN-1020 manufactured by NIPPON KAYAKU CO., LTD.
Epikote 828: Bisphenol type epoxy compound, manufactured by Yuka Shell Epoxy Co., Ltd.
PR-50781: Resol resin manufactured by Sumitomo Durez Co., Ltd.
PR-175: Resol resin manufactured by Sumitomo Durez Co., Ltd.
PR-22193: Novolak resin manufactured by Sumitomo Durez Co., Ltd.
PR-53647: Novolak resin manufactured by Sumitomo Durez Co., Ltd.

Comparative Examples 1, 2 and 3

A film composed only of each of polyimide resins PI-1, PI-2 and PI-3 was prepared and the bonding strength to a plate of 42 alloy was measured in the same manner as in the Examples to obtain the results shown in Table 5.

Comparative Example 4

An adhesive tape was obtained from a resin prepared from only 100 g of polyimide resin PI-1 and 20 g of Epikote 828 and subjected to measurement of bonding strength in the same manner as in the Examples to obtain the results shown in Table 5.

From Tables 4 and 5, it can be seen that the bonding strengths of the resin films of the Examples are only slightly lowered even after absorption of moisture; however, the bonding strengths of polyimide resin films of the Comparative Examples after absorption of moisture are remarkably lower than those in the normal state.

TABLE 4

| Recipe | Example 1 | Example 2 | Example 3 | Example 4 | Example 5 | Example 6 |
| --- | --- | --- | --- | --- | --- | --- |
| Component (A) (*1) | PI-1 | Same as left | PI-1 | PI-2 | PI-3 | Same as left |
| Amount (g) | 100 | | 100 | 100 | 100 | |
| Component (B) (*2) | Epikote 828 | | YX-4000H | EOCN-1020 | Epikote 828 | |
| Amount (g) | 40 | | 20 | 50 | 20 | |
| Component (C) (*3) | PR-50781 | | PR-175 | PR-53647 | PR-22193 | |
| Amount (g) | 5.0 | | 10 | 10 | 1.0 | |
| Characteristics Solubility* | | | | | | |
| DMF | S | | S | S | S | |
| 1,4-DO | S | | S | S | S | |
| THF | S | | S | S | S | |
| Glass transition temp. (°C.) | 125 | | 134 | 111 | 158 | |
| Tensile Characteristics | | | | | | |
| Modulus (kgf/mm$^2$) | 203 | | 196 | 188 | 220 | |

TABLE 4-continued

| Recipe | Example 1 | Example 2 | Example 3 | Example 4 | Example 5 | Example 6 |
|---|---|---|---|---|---|---|
| Elongation (%) | 5.54 | | 5.46 | 5.92 | 5.73 | |
| Strength (kgf/mm$^2$) | 5.12 | | 5.24 | 5.08 | 5.64 | |
| Young's modulus | | | | | | |
| @30° C. GPa | 1.92 | | 1.97 | 1.62 | 1.72 | |
| @250° C. MPa | 1.21 | | 1.18 | 1.64 | 2.23 | |
| Film adhesive | | | | | | |
| Support to be coated | Upilex | Diafoil | Upilex | Upilex | Upilex | |
| Bonding strength to 42 alloy (kgf/cm) | | | | | | |
| Normal state | 1.89 | 1.56** | 1.73 | 1.81 | 1.92 | 1.42** |
| After PC-treatment | 1.44 | 1.50** | 1.38 | 1.52 | 1.48 | 1.35** |

Note:
*"S" means "soluble".
**Bonding strength when film adhesive was broken.
(*1): Polyimide resin
(*2): Epoxy compound
(*3): Compound having active hydrogen group which can react with the epoxy compound.

TABLE 5

| Recipe | Comp. Ex. 1 | Comp. Ex. 2 | Comp. Ex. 3 | Comp. Ex. 4 |
|---|---|---|---|---|
| Component (A) (*1) | PI-1 | PI-2 | PI-3 | PI-1 |
| Amount (g) | 100 | 100 | 100 | 100 |
| Component (B) (*2) | — | — | — | Epikote 828 |
| Amount (g) | — | — | — | 20 |
| Component (C) (*3) | — | — | — | — |
| Amount (g) | — | — | — | — |
| Bonding strength to 42 alloy (kgf/cm) | | | | |
| Normal state | 1.98 | 2.07 | 1.82 | 2.05 |
| After PC-treatment | 0.72 | 0.68 | 0.83 | 0.51 |

Note:
(*1): Polyimide resin
(*2): Epoxy compound
(*3): Compound having active hydrogen group which can react with the epoxy compound.

Example 7

In a glass flask were placed 100 g of polyimide resin PI-4 and 355 g of DMF, and they were sufficiently stirred at room temperature to completely dissolve the polyimide resin in DMF. After uniform dissolution, 40 g of bisphenol A type epoxy compound (Epikote 828 manufactured by Yuka Shell Epoxy Co., Ltd.) was added to the solution and the resulting mixture was stirred at room temperature for two hours, after which it was confirmed that the epoxy compound was uniformly dissolved in the solution. With stirring, 5.0 g of a resol resin (PR-50781 manufactured by Sumitomo Durez Co., Ltd.) was gradually added to the system, and stirring was continued for a further two hours to prepare a heat resistant resin solution. This solution composition did not gel even after allowed to stand at room temperature for five days and was kept in the uniform solution state.

The resin solution thus obtained was coated on a planished stainless steel plate by means of a doctor blade to obtain a film having a thickness of 50 μm. The drying temperature was at most 195° C. and the drying time was 20 minutes. Solubility, glass transition temperature, tensile characteristics and Young's modulus are shown in Table 6.

This varnish was coated on one side of a polyimide film (Upilex SGA having a thickness of 50 μm manufactured by Ube Industries Co., Ltd.) to obtain an adhesive tape in which the thickness of adhesive layer was 30 μm. The drying temperature was at most 200° C. and the drying time was 15 minutes. This adhesive tape was subjected to thermal compression bonding to a plate of 42 alloy to prepare a test piece (Thermal compression bonding was effected at 250° C. for two seconds and after release of pressure, annealing was effected at 250° C. for 30 seconds. The pressure applied to the bonding surface was 4 kgf/cm$^2$ as calculated from the gauge pressure and bonding area.), and a 180° peel strength was measured in a tensile tester to obtain the results shown in Table 6. The bonding strength means the 180° peel strength at room temperature measured (drawing speed: 50 mm/min) in the normal state and after the treatment (125° C., 48 hours, R. H. 100%) in a pressure cooker. At the ruptured cross-section of the test piece, the bonded resin layer underwent cohesive failure and no bubble or void was confirmed at all.

Example 8 to 12

In the same manner as in Example 7, resin solutions were prepared with the recipes shown in Table 6 and films and adhesive tapes were prepared therefrom. The evaluation results obtained are shown in Table 6.

TABLE 6

| Recipe | Example 7 | Example 8 | Example 9 | Example 10 | Example 11 | Example 12 |
|---|---|---|---|---|---|---|
| Component (A) (*1) | PI-4 | Same as left | PI-4 | PI-5 | PI-6 | Same as left |
| Amount (g) | 100 | | 100 | 100 | 100 | |
| Component (B) (*2) | Epikote 828 | | YX-4000H | EOCN-1020 | XY-4000H | |
| Amount (g) | 40 | | 20 | 50 | 20 | |
| Component (C) (*3) | PR-50781 | | PR-175 | PR-53647 | PR-175 | |
| Amount (g) | 5.0 | | 5.0 | 1.0 | 1.0 | |
| Characteristics Solubility* | | | | | | |
| DMF | S | | S | S | S | |
| 1,4-DO | S | | S | S | S | |
| THF | S | | S | S | S | |
| Glass transition temp. (°C.) | 118 | | 137 | 116 | 132 | |
| Tensile characteristics | | | | | | |
| Modulus (kgf/mm$^2$) | 174 | | 192 | 183 | 189 | |
| Elongation (%) | 5.43 | | 5.28 | 5.14 | 5.42 | |
| Strength (kgf/mm$^2$) | 6.28 | | 6.37 | 5.88 | 6.15 | |
| Young's modulus | | | | | | |
| @30° C. GPa | 1.45 | | 1.75 | 1.15 | 2.03 | |
| @250° C. MPa | 0.92 | | 1.56 | 1.49 | 2.40 | |
| Film adhesive | | | | | | |
| Support to be coated | Upilex | Diafoil | Upilex | Upilex | Upilex | Diafoil |
| Bonding strength to 42 alloy (kgf/cm) | | | | | | |
| Normal state | 1.88 | 1.42** | 1.75 | 1.86 | 1.97 | 1.56** |
| After PC-treatment | 1.12 | 1.40** | 1.08 | 1.05 | 1.34 | 1.48** |

Note:
*"S" means "soluble".
**Bonding strength when film adhesive was broken.
(*1): Polyimide resin
(*2): Epoxy compound
(*3): Compound having active hydrogen group which can react with the epoxy compound.

Examples 13 to 17

In the same manner as in Example 7, resin solutions were prepared with the recipes shown in Table 7, and films and adhesive tapes were prepared therefrom. The evaluation results obtained are shown in Table 7.

Comparative Examples 5, 6 and 7

A film composed only of polyimide resin PI-4, PI-5 or PI-6 was prepared, and the bonding strength to a plate of 42 alloy was measured in the same manner as in the Examples, and the results obtained are shown in Table 8.

Comparative Example 8

An adhesive tape obtained from only 100 g of polyimide resin PI-4 and 20 g of Epikote 828 was subjected to measurement of bonding strength in the same manner as in the Examples to obtain the results shown in Table 8.

Comparative Example 9

A film composed only of polyimide resin PI-7 was prepared, and the bonding strength to a plate of 42 alloy was measured in the same manner as in the Examples to obtain the results shown in Table 8.

Comparative Example 10

An adhesive tape was prepared from a resin solution prepared only from 100 g of polyimide resin PI-2 and 20 g of Epikote 828 and subjected to measurement of bonding strength in the same manner as in the Examples to obtain the results shown in Table 8.

Form the results shown in Tables 6 to 8, it is seen that the bonding strengths of the resin films of the Examples are only slightly lowered even after the moisture absorption, while the bonding strengths of the polyimide resin films of the Comparative Examples after moisture absorption are remarkably lower than those in the normal state.

TABLE 7

| Recipe | Example 13 | Example 14 | Example 15 | Example 16 | Example |
|---|---|---|---|---|---|
| Component (A) (*1) | PI-2 | PI-2 | PI-7 | PI-7 | Same as left |
| Amount (g) | 100 | 100 | 100 | 100 | |
| Component (B) (*2) | EOCN-1020 | YX-4000H | YX-4000H | Epikote 828 | |
| Amount (g) | 50 | 20 | 20 | 20 | |
| Component (C) (*3) | PR-53647 | PR-175 | PR-175 | PR-22193 | |
| Amount (g) | 10 | 10 | 1.0 | 1.0 | |
| Characteristics Solubility* | | | | | |
| DMF | S | S | S | S | |
| 1,4-DO | S | S | S | S | |
| THF | S | S | S | S | |
| Glass transition temp. (°C.) | 111 | 122 | 139 | 142 | |
| Tensile characteristics | | | | | |
| Modulus (kgf/mm$^2$) | 188 | 190 | 207 | 210 | |
| Elongation (%) | 5.92 | 5.37 | 6.03 | 6.12 | |
| Strength (kgf/mm$^2$) | 5.08 | 4.92 | 5.41 | 5.38 | |
| Young's modulus | | | | | |
| @30° C. GPa | 1.62 | 2.01 | 1.68 | 1.47 | |
| @250° C. MPa | 1.64 | 2.27 | 1.12 | 1.05 | |
| Film adhesive Support to be coated | Diafoil | Upilex | Upilex | Upilex | Diafoil |
| Bonding strength to 42 alloy (kgf/cm) | | | | | |
| Normal state | 1.52** | 2.01 | 1.83 | 1.76 | 1.44** |
| After PC-treatment | 1.24** | 1.63 | 1.24 | 1.17 | 1.38** |

Note:
*"S" means "soluble".
**Bonding strength when film adhesive was broken.
(*1): Polyimide resin
(*2): Epoxy compound
(*3): Compound having active hydrogen group which can react with the epoxy compound.

TABLE 8

| Recipe | Comp. Ex. 5 | Comp. Ex. 6 | Comp. Ex. 7 | Comp. Ex. 8 | Comp. Ex. 9 | Comp. Ex. 10 |
|---|---|---|---|---|---|---|
| Component (A) (*1) | PI-4 | PI-5 | PI-6 | PI-4 | PI-7 | PI-2 |
| Amount (g) | 100 | 100 | 100 | 100 | 100 | 100 |
| Component (B) (*2) | — | — | — | Epikote 828 | — | Epikote 828 |
| Amount (g) | — | — | — | 20 | — | 20 |
| Component (C) (*3) | — | — | — | — | — | — |
| Amount (g) | — | — | — | — | — | — |
| Bonding strength to 42 alloy (kgf/cm) | | | | | | |
| Normal state | 1.57 | 1.83 | 2.14 | 1.38 | 1.72 | 1.86 |

TABLE 8-continued

| Recipe | Comp. Ex. 5 | Comp. Ex. 6 | Comp. Ex. 7 | Comp. Ex. 8 | Comp. Ex. 9 | Comp. Ex. 10 |
|---|---|---|---|---|---|---|
| After PC-treatment | 0.66 | 0.42 | 0.71 | 0.42 | 0.53 | 0.41 |

Note:
(*1): Polyimide resin
(*2): Epoxy compound
(*3): Compound having active hydrogen group which can react with the epoxy compound.

Example 18

In a glass flask were placed 100 g of polyimide resin PI-8 and 355 g of DMF, and they were sufficiently stirred at room temperature to completely dissolve the polyimide resin in DMF. After uniform dissolution, 40 g of bisphenol A type epoxy compound (Epikote 828 manufactured by Yuka Shell Epoxy Co., Ltd.) was added to the solution and the resulting mixture was stirred at room temperature for two hours, after which it was confirmed that the epoxy compound was uniformly dissolved in the solution. With stirring, 5.0 g of a resol resin (PR-50781 manufactured by Sumitomo Durez Co., Ltd.) was gradually added to the system, and stirring was continued for a further two hours to prepare a heat resistant resin solution. This solution composition did not gel even after allowed to stand at room temperature for ten days and was kept in the uniform solution state.

The resin solution thus obtained was coated on a planished stainless steel plate by means of a doctor blade to obtain a film having a thickness of 50 μm. The drying temperature was at most 195° C. and the drying time was 20 minutes. Solubility, glass transition temperature and tensile characteristics are shown in Table 9.

This varnish was coated on one side of a polyimide film (Yupilex SGA having a thickness of 50 μm, a trade name of Ube Industries Co., Ltd.) to obtain an adhesive tape in which the thickness of adhesive layer was 30 μm. The drying temperature was at most 200° C. and the drying time was 15 minutes. This adhesive tape was subjected to thermal compression bonding to a plate of 42 alloy to prepare a test piece (Thermal compression bonding was effected at 250° C. for two seconds and after release of pressure, annealing was effected at 250° C. for 30 seconds. The pressure applied to the bonding surface was 4 kgf/cm² as calculated from the gauge pressure and bonding area.), and a 180° peel strength was measured in a tensile tester to obtain the results shown in Table 9. The bonding strength means the 180° peel strength at room temperature or 240° C. measured (drawing speed: 50 mm/min) in the normal state and after the treatment (125° C., 48 hours, R. H. 100%) in a pressure cooker. At the ruptured cross-section of the test piece, the bonded resin layer underwent cohesive failure and no bubble or void was confirmed at all.

Examples 19 to 23

In the same manner as in Example 18, a heat resistant resin solution was prepared with the recipe shown in Table 9 and a film or an adhesive tape was prepared therefrom. The evaluation results obtained are shown in Table 9.

Comparative Examples 11 and 12

In the same manner as in Example 18, an adhesive tape composed only of polyimide resin PI-8 and an adhesive tape composed only of polyimide PI-9 were prepared, and the bonding strengths to a plate of 42 alloy were measured to obtain the results shown in Table 10.

Comparative Example 13

An adhesive tape was prepared from a resin composed only of 100 g of polyimide resin PI-8 and 20 g of PR-50781 and subjected to measurement of bonding strength in the same manner as in Example 18 to obtain the results shown in Table 10.

Comparative Example 14

An adhesive tape was prepared from a resin composed only of 100 g of polyimide resin PI-8 and 20 g of Epikote 828 and subjected to measurement of bonding strength in the same manner as in Example 18 to obtain the results shown in Table 10.

From Tables 9 and 10, it is seen that the strengths at a high temperature of the adhesive tapes of the Comparative Examples after the treatment in a pressure cooker are remarkably lower than those of the adhesive tapes obtained from the resin compositions of the Examples.

From the above Examples, it is seen that a film adhesive excellent in heat resistance and moldability is obtained by this invention.

TABLE 9

| Recipe | Example 18 | Example 19 | Example 20 | Example 21 | Example 22 | Example 23 |
|---|---|---|---|---|---|---|
| Component (A) (*1) | PI-8 | Same as left | PI-8 | PI-9 | PI-9 | Same as left |
| Amount (g) | 100 | | 100 | 100 | 100 | |
| Component (B) (*2) | Epikote 828 | | YX-4000H | EOCN-1020 | XY-4000H | |
| Amount (g) | 40 | | 20 | 50 | 20 | |
| Component (C) (*3) | PR-50781 | | PR-175 | PR-53647 | PR-22193 | |
| Amount (g) | 5.0 | | 5.0 | 1.0 | 5.0 | |

TABLE 9-continued

| Recipe | Example 18 | Example 19 | Example 20 | Example 21 | Example 22 | Example 23 |
|---|---|---|---|---|---|---|
| Characteristics Solubility* | | | | | | |
| DMF | S | | S | S | S | |
| 1,4-DO | S | | S | S | S | |
| THF | S | | S | S | S | |
| Glass transition temp. (°C.) | 144 | | 155 | 112 | 127 | |
| Tensile characteristics | | | | | | |
| Modulus (kgf/mm$^2$) | 186 | | 201 | 161 | 191 | |
| Elongation (%) | 5.98 | | 5.46 | 6.90 | 6.12 | |
| Strength (kgf/mm$^2$) | 6.38 | | 6.96 | 6.90 | 6.48 | |
| Young's modulus | | | | | | |
| @30° C. GPa | 1.55 | | 1.28 | 2.01 | 1.68 | |
| @250° C. MPa | 2.28 | | 2.54 | 1.56 | 1.99 | |
| Film adhesive | | | | | | |
| Support to be coated | Upilex | Diafoil | Upilex | Upilex | Upilex | |
| Bonding strength to 42 alloy (kgf/cm) | | | | | | |
| Normal state | 2.43 | 1.66 | 2.80 | 1.80 | 2.00 | 1.45** |
| After PC-treatment @ RT | 1.82 | 1.34 | 2.22 | 2.12 | 1.86 | 1.22** |
| After PC-treatment @ 240° C. | 0.98 | 0.78** | 0.72 | 0.99 | 0.95 | 0.68** |

Note:
*"S" means "soluble".
**Bonding strength when film adhesive was broken.
(*1): Polyimide resin
(*2): Epoxy compound
(*3): Compound having active hydrogen group which can react with the epoxy compound.

TABLE 10

| Recipe | Comp. Ex. 11 | Comp. Ex. 12 | Comp. Ex. 13 | Comp. Ex. 14 |
|---|---|---|---|---|
| Component (A) (*1) | PI-8 | PI-9 | PI-8 | PI-8 |
| Amount (g) | 100 | 100 | 100 | 100 |
| Component (B) (*2) | — | — | — | Epikote 828 |
| Amount (g) | — | — | — | 20 |
| Component (C) (*3) | — | — | PR-50781 | — |
| Amount (g) | — | — | 20 | — |
| Bonding strength to 42 alloy (kgf/cm) | | | | |
| Normal state | 2.71 | 2.43 | 1.88 | 2.25 |
| After PC-treatment @ RT | 2.10 | 1.98 | 1.76 | 1.78 |
| After PC-treatment @ 240° C. | 0.36 | 0.20 | 0.18 | 0.23 |

Note:
(*1): Polyimide resin
(*2): Epoxy compound
(*3): Compound having active hydrogen group which can react with the epoxy compound.

The case where a coupling agent is further added to the heat resistant resin composition of this invention is explained in detail below referring to Examples.

Example 24

In a glass flask were placed 100 g of polyimide resin PI-1 and 350 g of DMF, and they were sufficiently stirred at room temperature to completely dissolve the polyimide resin in DMF. After uniform dissolution, 40 g of bisphenol A type epoxy compound (Epikote 828 manufactured by Yuka Shell Epoxy Co., Ltd.) was added to the solution and the resulting mixture was stirred at room temperature for two hours, after which it was confirmed that the epoxy compound was uniformly dissolved in the solution, and 5 g of a silane coupling agent (trismethoxyethoxyvinylsilane, KBC 1003 manufactured by Shin-Etsu Chemical Co., Ltd.) was added and stirring was effected at room temperature for one hour. After it was confirmed that the silane coupling agent was completely dissolved in the solution, 5.0 g of a resol resin (PR-50781 manufactured by Sumitomo Durez Co., Ltd.) was gradually added to the system while the system was stirred. Stirring was continued for a further two hours to prepare a heat resistant resin solution. This solution composition did not gel even after allowed to stand at room temperature for five days and was kept in the uniform solution state.

The resin solution thus obtained was coated on a planished stainless steel plate by means of a doctor blade to obtain a film having a thickness of 50 $\mu$m. The drying temperature was at most 195° C. and the drying time was 20 minutes. Solubility, glass transition temperature, tensile characteristics and Young's modulus are shown in Table 11.

This varnish was coated on one side of a polyimide film (Upilex SGA having a thickness of 50 $\mu$m, a trade name of Ube Industries Co., Ltd.) to obtain an adhesive tape in which the thickness of adhesive layer was 30 $\mu$m. The drying temperature was at most 200° C. and the drying time was 15 minutes. This adhesive tape was subjected to thermal compression bonding to a plate of 42 alloy to prepare a test piece (Thermal compression bonding was effected at 250° C. for two seconds and after release of pressure, annealing was effected at 250° C. for 30 seconds. The pressure applied to the bonding surface was 4 kgf/cm$^2$ as calculated from gauge pressure and bonding area.), and a 180° peel strength was measured in a tensile tester to obtain the results shown in Table 11. The bonding strength means the 180° peel strength at room temperature or 240° C. measured (drawing speed: 50 mm/min) in the normal state and after the treatment (125° C., 48 hours, R. H. 100%) in a pressure cooker. At the ruptured cross-section of the test piece, the bonded resin layer underwent cohesive failure and no bubble or void was confirmed at all.

Examples 25 to 29

In the same manner as in Example 24, resin solutions were prepared with the recipes shown in Table 11 and films and adhesive tapes were prepared therefrom. The evaluation results obtained are shown in Table 11.

Incidentally, the abbreviations for the coupling agent (D) used in Tables 11 to 18 have the following meanings:
KBC 1003: Trismethoxyethoxyvinylsilane (manufactured by Shin-Etsu Chemical Co., Ltd.)
KBE 1003: Triethoxyvinylsilane (manufactured by Shin-Etsu Chemical Co., Ltd.)
KBM 573: N-Phenyl-y-aminopropyltrimethoxysilane (manufactured by Shin-Etsu Chemical Co., Ltd.)

TABLE 11

| Recipe | Example 24 | Example 25 | Example 26 | Example 27 | Example 28 | Example 29 |
|---|---|---|---|---|---|---|
| Component (A) (*1) | PI-1 | Same as left | PI-1 | PI-2 | PI-3 | Same as left |
| Amount (g) | 100 | | 100 | 100 | 100 | |
| Component (B) (*2) | Epikote 828 | | YX-4000H | EOCN-1020 | Epikote 828 | |
| Amount (g) | 40 | | 20 | 50 | 20 | |
| Component (C) (*3) | PR-50781 | | PR-175 | PR-53647 | PR-22193 | |
| Amount (g) | 5.0 | | 10 | 10 | 1.0 | |
| Component (D) (*4) | KBC1003 | | KBE1003 | KBM573 | KBM573 | |
| Amount (g) | 5.0 | | 10 | 5.0 | 1.0 | |
| Characteristics Solubility* | | | | | | |
| DMF | S | | S | S | S | |
| 1,4-DO | S | | S | S | S | |
| THF | S | | S | S | S | |
| Glass transition temp. (°C.) | 129 | | 138 | 121 | 155 | |
| Tensile characteristics | | | | | | |
| Modulus (kgf/mm$^2$) | 191 | | 180 | 175 | 205 | |
| Elongation (%) | 5.73 | | 5.61 | 5.78 | 6.05 | |
| Strength (kgf/mm$^2$) | 5.03 | | 5.18 | 5.17 | 5.25 | |
| Young's modulus | | | | | | |
| @30° C. GPa | 1.84 | | 2.11 | 1.47 | 1.83 | |
| @250° C. MPa | 2.32 | | 3.45 | 2.51 | 3.19 | |
| Film adhesive | | | | | | |
| Support to be coated | Upilex | Diafoil | Upilex | Upilex | Upilex | Diafoil |

TABLE 11-continued

| Recipe | Example 24 | Example 25 | Example 26 | Example 27 | Example 28 | Example 29 |
|---|---|---|---|---|---|---|
| Bonding strength to 42 alloy (kgf/cm) | | | | | | |
| Normal state | 1.89 | 1.24** | 1.73 | 1.81 | 1.58 | 1.12** |
| After PC-treatment @ RT | 1.44 | 1.30** | 1.38 | 1.52 | 1.35 | 1.22** |
| After PC-treatment @ 240° C. | 0.87 | 0.66** | 0.92 | 0.90 | 0.84 | 0.68** |

Note:
*"S" means "soluble".
**Bonding strength when film adhesive was broken.
(*1): Polyimide resin
(*2): Epoxy compound
(*3): Compound having active hydrogen group which can react with the epoxy compound.
(*4): Coupling agent Comparative Examples 15 to 18

A resin composition comprising the polyimide resin alone or in combination of one or two of the components (B) to (D) was prepared. Subsequently, in the same manner as in the Examples, adhesive tapes were prepared and subjected to measurement of bonding strength to a plate of 42 alloy. The results obtained are shown in Table 12.

From Tables 11 and 12, it is seen that the bonding strengths of the resin films of the Examples are only slightly lowered even after moisture absorption. Also, the hot bonding strengths after moisture absorption are lower than those in the normal state; however, as compared with the Comparative Examples, it is possible to prevent the bonding strength from being greatly lowered.

TABLE 12

| Recipe | Comp. Ex. 15 | Comp. Ex. 16 | Comp. Ex. 17 | Comp. Ex. 18 |
|---|---|---|---|---|
| Component (A) (*1) | PI-1 | PI-2 | PI-3 | PI-1 |
| Amount (g) | 100 | 100 | 100 | 100 |
| Component (B) (*2) | — | EOCN-1020 | — | Epikote 828 |
| Amount (g) | — | 50 | — | 20 |
| Component (C) (*3) | — | PR-53647 | PR-175 | — |
| Amount (g) | — | 10 | 10 | — |
| Component (D) (*4) | — | — | KBM573 | — |
| Amount (g) | — | — | 5.0 | — |
| Bonding strength to 42 alloy (kgf/cm) | | | | |
| Normal state | 1.98 | 2.07 | 1.82 | 2.05 |
| After PC-treatment @ RT | 0.72 | 0.68 | 0.83 | 0.51 |
| After PC-treatment @ 240° C. | 0.24 | 0.43 | <0.1 | 0.26 |

TABLE 12-continued

| Recipe | Comp. Ex. 15 | Comp. Ex. 16 | Comp. Ex. 17 | Comp. Ex. 18 |
|---|---|---|---|---|

Note:
(*1): Polyimide resin
(*2): Epoxy compound
(*3): Compound having active hydrogen group which can react with the epoxy compound.
(*4): Coupling agent Example 30

In a glass flask were placed 100 g of polyimide resin PI-4 and 350 g of DMF, and they were sufficiently stirred at room temperature to completely dissolve the polyimide resin in DMF. After uniform dissolution, 40 g of bisphenol A type epoxy compound (Epikote 828 manufactured by Yuka Shell Epoxy Co., Ltd.) was added to the solution and the resulting mixture was stirred at room temperature for two hours, after which it was confirmed that the epoxy compound was uniformly dissolved in the solution, and 1 g of a silane coupling agent (trismethoxyethoxyvinylsilane, KBC 1003 manufactured by Shin-Etsu Chemical Co., Ltd.) was added and stirring was effected at room temperature for one hour. After it was confirmed that the silane coupling agent was completely dissolved in the solution, 5.0 g of a resol resin (PR-50781 manufactured by Sumitomo Durez Co., Ltd.) was gradually added to the system while the system was stirred. Stirring was continued for a further two hours to prepare a heat resistant resin solution. This solution composition did not gel even after allowed to stand at room temperature for five days and was kept in the uniform solution state.

The resin solution thus obtained was coated on a planished stainless steel plate by means of a doctor blade to obtain a film having a thickness of 50 μm. The drying temperature was at most 195° C. and the drying time was 20 minutes. Solubility, glass transition temperature, tensile characteristics and Young's modulus are shown in Table 13.

This varnish was coated on one side of a polyimide film (Upilex SGA having a thickness of 50 μm, a trade name of Ube Industries Co., Ltd.) to obtain an adhesive tape in which the thickness of adhesive layer was 30 μm. The drying temperature was at most 200° C. and the drying time was 15 minutes. This adhesive tape was subjected to thermal compression bonding to a plate of 42 alloy to prepare a test piece (Thermal compression bonding was effected at 250° C. for two seconds and after release of pressure, annealing was effected at 250° C. for 30 seconds. The pressure applied to the bonding surface was 4 kgf/cM$^2$ as calculated from gauge pressure and bonding area.), and a 180° peel strength was measured in a tensile tester to obtain the results shown in Table 13. The bonding strength means the 180° peel strength at room temperature or 240° C. measured (drawing speed: 50 mm/min) in the normal state and after the treatment (125° C., 48 hours, R. H. 100%) in a pressure cooker. At the ruptured cross-section of the test piece, the bonded resin layer underwent cohesive failure and no bubble or void was confirmed at all.

Examples 31 to 35

In the same manner as in Example 30, a resin solution was prepared with the recipe shown in Table 13, and a film and an adhesive tape were prepared therefrom. The evaluation results obtained are shown in Table 13.

Comparative Examples 19 to 22

Resin compositions composed of the polyimide resin alone or in combination with one or two components of the components (B) to (D) were prepared. Subsequently, in the same manner as in the Examples, adhesive tapes were prepared and subjected to measurement of bonding strength to a plate of 42 alloy. The results obtained are shown in Table 14.

From the results in Tables 13 and 14, it is seen that the bonding strengths of the resin films of the Examples are only slightly lowered even after moisture absorption. Also, the bonding strengths at a high temperature after moisture absorption are lower than those in the normal state; however, as compared with the Comparative Examples, it is possible to prevent the bonding strength from being greatly lowered.

TABLE 13

| Recipe | Example 30 | Example 31 | Example 32 | Example 33 | Example 34 | Example 35 |
|---|---|---|---|---|---|---|
| Component (A) (*1) | PI-4 | Same as left | PI-4 | PI-5 | PI-6 | Same as left |
| Amount (g) | 100 | | 100 | 100 | 100 | |
| Component (B) (*2) | Epikote 828 | | YX-4000H | EOCN-1020 | XY-4000H | |
| Amount (g) | 40 | | 20 | 50 | 20 | |
| Component (C) (*3) | PR-50781 | | PR-175 | PR-53647 | PR-175 | |
| Amount (g) | 5.0 | | 10 | 10 | 10 | |
| Component (D) (*4) | KBC1003 | | KBM573 | KBC1003 | KBM573 | |
| Amount (g) | 1.0 | | 5.0 | 10 | 1.0 | |
| Characteristics Solubility* | | | | | | |
| DMF | S | | S | S | S | |
| 1,4-DO | S | | S | S | S | |
| THF | S | | S | S | S | |
| Glass transition temp. (°C.) | 117 | | 141 | 120 | 128 | |
| Tensile characteristics | | | | | | |
| Modulus (kgf/mm$^2$) | 160 | | 179 | 202 | 181 | |
| Elongation (%) | 5.52 | | 5.62 | 5.07 | 5.66 | |
| Strength (kgf/mm$^2$) | 6.25 | | 6.44 | 5.53 | 6.10 | |
| Young's modulus | | | | | | |
| @30° C. GPa | 1.25 | | 1.83 | 1.23 | 1.82 | |
| @250° C. MPa | 1.14 | | 1.62 | 1.27 | 2.13 | |
| Film adhesive | | | | | | |
| Support to be coated | Upilex | Diafoil | Upilex | Upilex | Upilex | Diafoil |
| Bonding strength to 42 alloy (kgf/cm) | | | | | | |
| Normal state | 1.63 | 1.26** | 1.91 | 1.74 | 1.65 | 1.24** |
| After PC-treatment @ RT | 1.18 | 1.10** | 1.21 | 1.00 | 1.25 | 1.00** |

TABLE 13-continued

| Recipe | Example 30 | Example 31 | Example 32 | Example 33 | Example 34 | Example 35 |
|---|---|---|---|---|---|---|
| After PC-treatment @ 240° C. | 0.80 | 0.68** | 1.03 | 0.78 | 0.94 | 0.70** |

Note:
*"S" means "soluble".
**Bonding strength when film adhesive was broken.
(*1): Polyimide resin
(*2): Epoxy compound
(*3): Compound having active hydrogen group which can react with the epoxy compound.
(*4): Coupling agent

TABLE 14

| Recipe | Comp. Ex. 19 | Comp. Ex. 20 | Comp. Ex. 21 | Comp. Ex. 22 |
|---|---|---|---|---|
| Component (A) (*1) | PI-4 | PI-5 | PI-6 | PI-4 |
| Amount (g) | 100 | 100 | 100 | 100 |
| Component (B) (*2) | — | XY-4000H | — | Epikote 828 |
| Amount (g) | — | 20 | — | 20 |
| Component (C) (*3) | — | PR-175 | PR-53647 | — |
| Amount (g) | — | 10 | 10 | — |
| Component (D) (*4) | — | — | KBC1003 | — |
| Amount (g) | — | — | 10 | — |
| Bonding strength to 42 alloy (kgf/cm) | | | | |
| Normal state | 1.57 | 1.75 | 1.51 | 1.38 |
| After PC-treatment @ RT | 0.66 | 1.08 | 0.37 | 0.42 |
| After PC-treatment @ 240° C. | 0.18 | 0.32 | <0.1 | <0.1 |

Note:
(*1): Polyimide resin
(*2): Epoxy compound
(*3): Compound having active hydrogen group which can react with the epoxy compound.
(*4): Coupling agent Example 36

In a glass flask were placed 100 g of polyimide resin PI-2 and 330 g of DMF, and they were sufficiently stirred at room temperature to completely dissolve the polyimide resin in DMF. After uniform dissolution, 50 g of phenol-novolak type epoxy compound (EOCN-1020 manufactured by NIPPON KAYAKU CO., LTD.) was added to the solution and the resulting mixture was stirred at room temperature for two hours, after which it was confirmed that the epoxy compound was uniformly dissolved in the solution, and 10 g of a silane coupling agent (trismethoxyethoxyvinylsilane, KBC 1003 manufactured by Shin-Etsu Chemical Co., Ltd.) was added and stirring was effected at room temperature for one hour. After it was confirmed that the silane coupling agent was completely dissolved in the solution, 10 g of a novolak resin (PR-53647 manufactured by Sumitomo Durez Co., Ltd.) was gradually added to the system while the system was stirred. Stirring was continued for a further two hours to prepare a heat resistant resin solution. This solution composition did not gel even after allowed to stand at room temperature for five days and was kept in the uniform solution state.

The resin solution thus obtained was coated on a planished stainless steel plate by means of a doctor blade to obtain a film having a thickness of 50 μm. The drying temperature was at most 195° C. and the drying time was 20 minutes. Solubility, glass transition temperature, tensile characteristics and Young's modulus are shown in Table 15.

This varnish was coated on one side of a polyimide film (Upilex SGA having a thickness of 50 μm, a trade name of Ube Industries Co., Ltd.) to obtain an adhesive tape in which the thickness of adhesive layer was 30 μm. The drying temperature was at most 200° C. and the drying time was 15 minutes. This adhesive tape was subjected to thermal compression bonding to a plate of 42 alloy to prepare a test piece (Thermal compression bonding was effected at 250° C. for two seconds and, after release of pressure, annealing was effected at 250° C. for 30 seconds. The pressure applied to the bonding surface was 4 kgf/cm$^2$ as calculated from gauge pressure and bonding area), and a 180° peel strength was measured in a tensile tester to obtain the results shown in Table 15. The bonding strength was obtained by measuring a 180° peel strength (drawing speed: 50 mm/min) at room temperature or 240° C. in the normal state or after the treatment (125° C., 48 hours, R. H. 100%) in a pressure cooker. At the ruptured cross-section of the test piece, the bonded resin layer underwent cohesive failure and no bubble or void was confirmed at all.

Examples 37 to 41

In the same manner as in Example 36, a resin solution was prepared with the recipe shown in Table 15 and a film and an adhesive tape were obtained therefrom. The evaluation results obtained are shown in Table 15.

Comparative Examples 23 to 26

A resin composition comprising a polyimide resin alone and resin compositions comprising a polyimide resin and one or two members selected from the components (B) to (D) shown in Table 16 were prepared. Subsequently, in the same manner as in Example 36, adhesive tapes were prepared therefrom and subjected to measurement of bonding strength to a plate of 42 alloy. The results obtained are shown in Table 16.

From the results in Tables 15 and 16, it is seen that the bonding strengths of the resin films in the Examples were only slightly lowered even after moisture absorption. Also, the hot bonding strengths after moisture absorption were lower than those in the normal state; however, as compared with those in the Comparative Examples, it is possible to prevent the strength from being greatly lowered.

TABLE 15

| Recipe | Comp. Example 36 | Comp. Ex. 37 | Comp. Ex. 38 | Comp. Ex. 39 | Comp. Ex. 40 | Comp. Example 41 |
|---|---|---|---|---|---|---|
| Component (A) (*1) | PI-2 | Same as left | PI-2 | PI-7 | PI-7 | Same as left |
| Amount (g) | 100 | | 100 | 100 | 100 | |
| Component (B) (*2) | EOCN-1020 | | YX-4000H | YX-4000H | Epikote 828 | |
| Amount (g) | 50 | | 20 | 20 | 20 | |
| Component (C) (*3) | PR-53647 | | PR-175 | PR-175 | PR-22193 | |
| Amount (g) | 10 | | 10 | 1.0 | 1.0 | |
| Component (D) (*4) | KBC1003 | | KBM573 | KBE1003 | KBM573 | |
| Amount (g) | 10 | | 5.0 | 1.0 | 1.0 | |
| Characteristics Solubility* | | | | | | |
| DMF | S | | S | S | S | |
| 1,4-DO | S | | S | S | S | |
| THF | S | | S | S | S | |
| Glass transition temp. (°C.) | 118 | | 130 | 145 | 140 | |
| Tensile characteristics | | | | | | |
| Modulus (kgf/mm$^2$) | 201 | | 195 | 198 | 204 | |
| Elongation (%) | 6.04 | | 5.74 | 6.11 | 5.89 | |
| Strength (kgf/mm$^2$) | 5.35 | | 5.16 | 5.20 | 4.92 | |
| Young's modulus | | | | | | |
| @30° C. GPa | 1.57 | | 1.83 | 1.88 | 1.32 | |
| @250° C. MPa | 2.45 | | 2.70 | 1.85 | 1.37 | |
| Film adhesive | | | | | | |
| Support to be coated | Upilex | Diafoil | Upilex | Upilex | Upilex | Diafoil |
| Bonding strength to 42 alloy (kgf/cm) | | | | | | |
| Normal state | 2.03 | 1.65** | 1.91 | 1.88 | 1.85 | 1.55** |
| After PC-treatment @ RT | 1.78 | 1.44** | 1.83 | 1.65 | 1.54 | 1.34** |
| After PC-treatment @ 240° C. | 1.05 | 0.88** | 1.12 | 0.94 | 1.04 | 0.91** |

Note:
*"S" means "soluble".
**Bonding strength when film adhesive was broken.
(*1): Polyimide resin
(*2): Epoxy compound
(*3): Compound having active hydrogen group which can react with the epoxy compound.
(*4): Coupling agent

TABLE 16

| Recipe | Comp. Ex. 23 | Comp. Ex. 24 | Comp. Ex. 25 | Comp. Ex. 26 |
|---|---|---|---|---|
| Component (A) (*1) | PI-1 | PI-1 | PI-2 | PI-1 |
| Amount (g) | 100 | 100 | 100 | 100 |
| Component (B) (*2) | — | XY-4000H | — | Epikote 828 |
| Amount (g) | — | 20 | — | 20 |
| Component (C) (*3) | — | PR-175 | PR-53647 | — |
| Amount (g) | — | 10 | 10 | — |
| Component (D) (*4) | — | — | KBC1003 | — |
| Amount (g) | — | — | 1.0 | — |
| Bonding strength to 42 alloy (kgf/cm) | | | | |
| Normal state | 2.07 | 2.01 | 1.43 | 1.86 |

TABLE 16-continued

| Recipe | Comp. Ex. 23 | Comp. Ex. 24 | Comp. Ex. 25 | Comp. Ex. 26 |
|---|---|---|---|---|
| After PC-treatment @ RT | 0.68 | 1.63 | 0.35 | 0.41 |
| After PC-treatment @ 240° C. | <0.1 | 0.38 | <0.1 | <0.1 |

Note:
(*1): Polyimide resin
(*2): Epoxy compound
(*3): Compound having active hydrogen group which can react with the epoxy compound.
(*4): Coupling agent Example 42

In a glass flask were placed 100 g of polyimide resin PI-1 and 355 g of DMF, and they were sufficiently stirred at room temperature to completely dissolve the polyimide resin in DMF. After uniform dissolution, 40 g of bisphenol A type epoxy compound (Epikote 828 manufactured by Yuka Shell Epoxy Co., Ltd.) was added to the solution and the resulting mixture was stirred at room temperature for two hours, after which it was confirmed that the epoxy compound was uniformly dissolved in the solution, and 1 g of a silane coupling agent (trismethoxyethoxyvinylsilane, KBC 1003 manufactured by Shin-Etsu Chemical Co., Ltd.) was added and stirring was effected at room temperature for one hour. After it was confirmed that the silane coupling agent was completely dissolved in the solution, 5 g of a resol resin (PR-50781 manufactured by Sumitomo Durez Co., Ltd.) was gradually added to the system while the system was stirred. Stirring was continued for a further two hours to prepare a heat resistant resin solution. This solution composition did not gel even after allowed to stand at room temperature for five days and was kept in the uniform solution state.

The resin solution thus obtained was coated on a planished stainless steel plate by means of a doctor blade to obtain a film having a thickness of 50 μm. The drying temperature was at most 195° C. and the drying time was 20 minutes. Solubility, glass transition temperature and tensile characteristics are shown in Table 17.

This varnish was coated on one side of a polyimide film (Upilex SGA having a thickness of 50 μm, a trade name of Ube Industries Co., Ltd.) to obtain an adhesive tape in which the thickness of adhesive layer was 30 μm. The drying temperature was at most 200° C. and the drying time was 15 minutes. This adhesive tape was subjected to thermal compression bonding to a plate of 42 alloy to prepare a test piece (The thermal compression bonding was effected at 250° C. for two seconds and, after release of pressure, annealing was effected at 250° C. for 30 seconds. The pressure applied to the bonding surface was 4 kgf/cm$^2$ as calculated from gauge pressure and bonding area.), and a 180° peel strength was measured in a tensile tester to obtain the results shown in Table 18. The bonding strength was obtained by measuring a 180° peel strength (drawing speed: 50 mm/min) at room temperature or 240° C. in the normal state or after the treatment (125° C., 48 hours, R. H. 100%) in a pressure cooker. At the ruptured cross-section of the test piece, the bonded resin layer underwent cohesive failure and no bubble or void was confirmed at all.

Examples 43 to 47

In the same manner as in Example 42, heat resistant resin solutions were prepared with the recipes shown in Table 17, and films and adhesive tapes were obtained therefrom. The evaluation results obtained are shown in Table 17.

Comparative Examples 27 to 30

A resin composition comprising a polyimide resin alone and resin compositions comprising a polyimide resin and one or two components selected from the components (B) to (D) shown in Table 18 were prepared. Subsequently, in the same manner as in Example 42, adhesive tapes were prepared and subjected to measurement of a bonding strength to a plate of 42 alloy. The results obtained are shown in Table 18.

From the results in Tables 17 and 18, it is seen that the hot strengths of the adhesive tapes in the Comparative Examples after the treatment in a pressure cooker were remarkably lower than those of the adhesive tapes obtained from the resin compositions in the Examples.

From the above Examples, it is seen that this invention enables the prevention of the hot bonding strength after moisture absorption from being greatly lowered, whereby film adhesives excellent in heat resistance and moldability can be obtained.

TABLE 17

| Recipe | Example 42 | Example 43 | Example 44 | Example 45 | Example 46 | Example 47 |
|---|---|---|---|---|---|---|
| Component (A) (*1) | PI-1 | Same as left | PI-1 | PI-2 | PI-2 | Same as left |
| Amount (g) | 100 | | 100 | 100 | 100 | |
| Component (B) (*2) | Epikote 828 | | YX-4000H | EOCN-1020 | XY-4000H | |
| Amount (g) | 40 | | 20 | 50 | 20 | |
| Component (C) (*3) | PR-50781 | | PR-175 | PR-53647 | PR-22193 | |
| Amount (g) | 5.0 | | 5.0 | 1.0 | 5.0 | |
| Component (D) (*4) | KBC1003 | | KBM573 | KBE1003 | KBM573 | |
| Amount (g) | 1.0 | | 5.0 | 10 | 1.0 | |
| Characteristics Solubility* | | | | | | |
| DMF | S | | S | S | S | |
| 1,4-DO | S | | S | S | S | |
| THF | S | | S | S | S | |

TABLE 17-continued

| Recipe | Example 42 | Example 43 | Example 44 | Example 45 | Example 46 | Example 47 |
|---|---|---|---|---|---|---|
| Glass transition temp. (°C.) | 140 | | 149 | 125 | 132 | |
| Tensile characteristics | | | | | | |
| Modulus (kgf/mm²) | 175 | | 199 | 159 | 201 | |
| Elongation (%) | 5.88 | | 5.52 | 6.68 | 6.01 | |
| Strength (kgf/mm²) | 6.25 | | 7.05 | 6.78 | 6.55 | |
| Young's modulus | | | | | | |
| @30° C. GPa | 1.64 | | 1.56 | 1.98 | 1.28 | |
| @250° C. MPa | 2.55 | | 2.85 | 2.01 | 1.68 | |
| Film adhesive | | | | | | |
| Support to be coated | Upilex | Diafoil | Upilex | Upilex | Upilex | Diafoil |
| Bonding strength to 42 alloy (kgf/cm) | | | | | | |
| Normal state | 2.48 | 1.70 | 2.68 | 2.10 | 1.99 | 1.65** |
| After PC-treatment @ RT | 2.11 | 1.55 | 2.30 | 2.12 | 2.01 | 1.48** |
| After PC-treatment @ 240° C. | 1.02 | 0.89** | 0.88 | 1.05 | 0.99 | 0.86** |

Note:
*"S" means "soluble".
**Bonding strength when film adhesive was broken.
(*1): Polyimide resin
(*2): Epoxy compound
(*3): Compound having active hydrogen group which can react with the epoxy compound.
(*4): Coupling agent

TABLE 18

| Recipe | Comp. Ex. 27 | Comp. Ex. 28 | Comp. Ex. 29 | Comp. Ex. 30 |
|---|---|---|---|---|
| Component (A) (*1) | PI-1 | PI-2 | PI-1 | PI-1 |
| Amount (g) | 100 | 100 | 100 | 100 |
| Component (B) (*2) | — | XY-4000H | — | Epikote 828 |
| Amount (g) | — | 20 | — | 20 |
| Component (C) (*3) | — | PR-175 | PR-50781 | — |
| Amount (g) | — | 10 | 20 | — |
| Component (D) (*4) | — | — | KBC1003 | — |
| Amount (g) | — | — | 10 | — |
| Bonding strength to 42 alloy (kgf/cm) | | | | |
| Normal state | 2.71 | 2.20 | 2.01 | 1.99 |
| After PC-treatment @ RT | 2.10 | 1.65 | 1.55 | 1.64 |
| After PC-treatment @ 240° C. | 0.36 | 0.15 | 0.15 | 0.11 |

Note:
(*1): Polyimide resin
(*2): Epoxy compound
(*3): Compound having active hydrogen group which can react with the epoxy compound.
(*4): Coupling agent

What is claimed is:

1. A heat resistant resin composition which comprises, as the main components, (A) 100 parts by weight of an organic solvent-soluble polyimide resin having a glass transition temperature of 350° C. or less, said polyimide resin comprising, as the main acid component, 4,4'-oxydiphthalic dianhydride and, as the amine components, (i) a diaminosiloxane compound of formula (1)

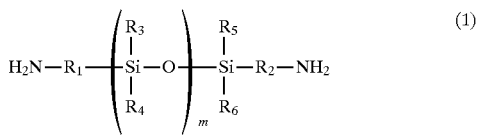

wherein $R_1$ and $R_2$ represent independently divalent aliphatic groups having 1 to 4 carbon atoms or divalent aromatic groups; $R_3$, $R_4$, $R_5$ and $R_6$ represent independently monovalent aliphatic or aromatic groups; and m represents an integer of 1 to 20, and (ii) 1,3-bis(3'-aminophenoxy) benzene, (B) 5 to 100 parts by weight of an epoxy compound having at least two epoxy groups in one molecule, (C) 0.1 to 20 parts by weight of a compound having an active hydrogen group which can react with the epoxy compound (B); and (D) 0.1 to 50 parts by weight of a silane coupling agent.

2. A heat resistant resin composition which comprises, as the main components, (A) 100 parts by weight of an organic solvent-soluble polyimide resin having a glass transition temperature of 350° C. or less, said polyimide resin comprising, as the main acid components, (i) 3,3',4,4'-biphenyltetracarboxylic dianhydride and (ii) 3,3',4,4'-benzophenonetetracarboxylic dianhydride and, as the main amine components, (i) a diaminosiloxane compound of formula (1)

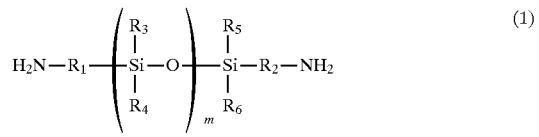

wherein $R_1$ and $R_2$ represent independently divalent aliphatic groups having 1 to 4 carbon atoms or divalent aromatic groups; $R_3$, $R_4$, $R_5$ and $R_6$ represent independently monovalent aliphatic or aromatic groups; and m represents an integer of 1 to 20, and (ii) at least one diamine selected from the group consisting of 2,2-bis[4-(4-aminophenoxy) phenyl]propane, 1,3-bis(3-aminophenoxy)benzene and dimethylphenylene-diamine;

(B) 5 to 100 parts by weight of an epoxy compound having at least two epoxy groups in one molecule, (C) 0.1 to 20 parts by weight of a compound having an active hydrogen group which can react with the epoxy compound (B); and (D) 0.1 to 50 parts by weight of a silane coupling agent.

3. A heat resistant resin composition which comprises, as the main components, (A) 100 parts by weight of an organic solvent-soluble polyimide resin having a glass transition temperature of 350° C. or less, said polyimide resin being obtained by mixing: a polyamic acid A obtained by reacting a moles of a siliconediamine represented by the following formula (2):

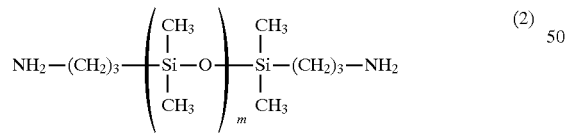

wherein m is an integer of 1 to 13, and b moles of another diamine as the amine components with c moles of at least one tetracarboxylic dianhydride selected from the group consisting of 4,4'-oxydiphthalic dianhydride, 3,3',4,4'-biphenyltetracarboxylic dianhydride and 3,3',4,4'-benzophenonetetracarboxylic dianhydride as the acid component wherein a, b and c satisfy the following relations:

$0.02 \leq a/(a+b) \leq 0.10$ and $0.960 \leq c/(a+b) \leq 1.04$ with a polyamic acid B obtained by reacting d moles of a siliconediamine represented by the above formula (2) and e moles of another diamine as the amine components with f moles of at least one tetracarboxylic dianhydride selected from the group consisting of 4,4'-oxydiphthalic dianhydride, 3,3',4,4'-biphenyltetra-carboxylic dianhydride and 3,3',4,4'-benzophenonete-tracarboxylic dianhydride as the acid component wherein d, e and f satisfy the following relations:

$0.20 \leq d/(d+e) \leq 0.70$ and $0.920 \leq f/(d+e) \leq 1.10$, in such a proportion that $0.12 \leq (a+d)/(a+b+d+e) \leq 0.50$ and then imidizing the mixture, (B) 5 to 100 parts by weight of an epoxy compound having at least two epoxy groups in one molecule, (C) 0.1 to 20 parts by weight of a compound having an active hydrogen group which can react with the epoxy compound (B); and (D) 0.1 to 50 parts by weight of a silane coupling agent.

4. A heat resistant film adhesive comprising, as the main components, (A) 100 parts by weight of an organic solvent-soluble polyimide resin having a glass transition temperature of 350° C. or less, said polyimide resin comprising, as the main acid component, 4,4'-oxydiphthalic dianhydride and, as the amine components, (i) a diaminosiloxane compound represented by the general formula (1)

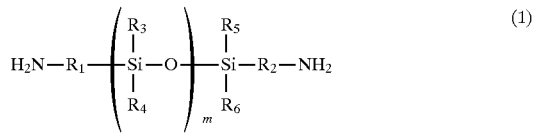

wherein $R_1$ and $R_2$ represent independently divalent aliphatic groups having 1 to 4 carbon atoms or divalent aromatic groups; $R_3$, $R_4$, $R_5$ and $R_6$ represent independently monovalent aliphatic or aromatic groups; and m represents an integer of 1 to 20, and (ii) 1,3-bis(3-aminophenoxy) benzene, (B) 5 to 100 parts by weight of an epoxy compound having at least two epoxy groups in one molecule, (C) 0.1 to 20 parts by weight of a compound having an active hydrogen group which can react with the epoxy compound (B); and (D) 0.1 to 50 parts by weight of a silane coupling agent.

5. A heat resistant film adhesive comprising, as the main components, (A) 100 parts by weight of an organic solvent-soluble polyimide resin having a glass transition temperature of 350° C. or less, said polyimide resin comprising, as the main acid components, (i) 3,3',4,4'-biphenyltetracarboxylic dianhydride and (ii) 3,3',4,4'-benzophenonetetracarboxylic dianhydride and, as the main amine components, (i) a diaminosiloxane compound of formula (1)

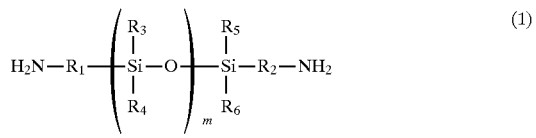

wherein $R_1$ and $R_2$ represent independently divalent aliphatic groups having 1 to 4 carbon atoms or divalent aromatic groups; $R_3$, $R_4$, $R_5$ and $R_6$ represent independently monovalent aliphatic or aromatic groups; and m represents an integer of 1 to 20, and (ii) at least one diamine selected from the group consisting of 2,2-bis[4-(4-aminophenoxy)phenyl]propane, 1,3-bis(3-aminophenoxy)benzene and dimethylphenylene-diamine, (B) 5 to 100 parts by weight of an epoxy compound having at least two epoxy groups in one molecule, (C) 0.1 to 20 parts by weight of a compound having an active hydrogen group which can react with the epoxy compound (B); and (D) 0.1 to 50 parts by weight of a silane coupling agent.

6. A heat resistant film adhesive comprising, as the main components, (A) 100 parts by weight of an organic solvent-soluble polyimide resin having a glass transition temperature of 350° C. or less, said polyimide resin being obtained by mixing a polyamic acid A obtained by reacting a moles of a siliconediamine represented by the formula (2)

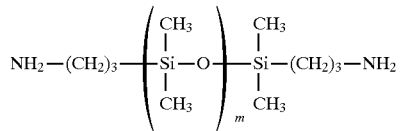

and b moles of another diamine as the amine components with c moles of at least one tetracarboxylic dianhydride selected from the group consisting of 4,4'-oxydiphthalic dianhydride, 3,3',4,4'-biphenyltetracarboxylic dianhydride and 3,3',4,4'-benzophenonetetracarboxylic dianhydride as the acid component wherein a, b and c satisfy the following relations:

$$0.02 \leq a/(a+b) \leq 0.10 \text{ and}$$

$$0.960 \leq c/(a+b) \leq 1.04$$

with a polyamic acid B obtained by reacting d moles of a siliconediamine represented by the above formula (2) and e moles of another diamine as the amine components with f moles of at least one tetracarboxylic dianhydride selected from the group consisting of 4,4'-oxydiphthalic dianhydride, 3,3',4,4'-biphenyltetracarboxylic dianhydride and 3,3',4,4'-benzophenonetetracarboxylic dianhydride as the acid component wherein d, e and f satisfy the following relations:

$$0.20 \leq d/(d+e) \leq 0.70 \text{ and}$$

$$0.920 \leq f/(d+e) \leq 1.10,$$

in such a proportion that $0.12 \leq (a+d)/(a+b+d+e) \leq 0.50$ and then imidizing the mixture, (B) 5 to 100 parts by weight of an epoxy compound having at least two epoxy groups in one molecule, (C) 0.1 to 20 parts by weight of a compound having an active hydrogen group which can react with the epoxy compound (B); and (D) 0.1 to 50 parts by weight of a silane coupling agent.

7. A process for producing a heat resistant film adhesive, which comprises casting a solution of the heat resistant resin composition according to claim 1 on at least one of a support;

drying said solution to provide a film; and peeling said film from said support.

8. A process for producing a heat resistant film adhesive, which comprises casting a solution of the heat resistant resin composition according to claim 2 on at least one of a support;

drying said solution to provide a film; and peeling said film from said support.

9. A process for producing a heat resistant film adhesive, which comprises casting a solution of the heat resistant resin composition according to claim 3 on at least one side of a support;

drying said solution to provide a film; and peeling said film from said support.

10. The process for producing a heat resistant film adhesive according to claim 7, wherein the solvent for the solution of the heat resistant resin composition is an organic solvent having a boiling point of 200° C. or less, and after the casting, the casted film is dried and then peeled from the support.

11. The process for producing a heat resistant film adhesive according to claim 8, wherein the solvent for the solution of the heat resistant resin composition is an organic solvent having a boiling point of 200° C. or less, and after the casting, the casted film is dried and then peeled from the support.

12. The process for producing a heat resistant film adhesive according to claim 9, wherein the solvent for the solution of the heat resistant resin composition is an organic solvent having a boiling point of 200° C. or less, and after the casting, the casted film is dried and then peeled from the support.

* * * * *